United States Patent [19]

Tokura et al.

[11] Patent Number: 4,693,115
[45] Date of Patent: Sep. 15, 1987

[54] DEVICE FOR MEASURING FLOW RATE OF AIR

[75] Inventors: Norihito Tokura, Aichi; Mitiyasu Moritugu, Nishio; Hisasi Kawai, Toyohashi, all of Japan

[73] Assignee: Nippon Soken, Inc., Nishio, Japan

[21] Appl. No.: 724,964

[22] Filed: Apr. 19, 1985

[30] Foreign Application Priority Data

Apr. 24, 1984 [JP] Japan .................................. 59-83269
Jul. 3, 1984 [JP] Japan .................................. 59-138219
Jan. 15, 1985 [JP] Japan .................................. 60-5552

[51] Int. Cl.$^4$ .............................................. G01F 1/68
[52] U.S. Cl. .................................................. 73/204
[58] Field of Search .............................. 73/204, 118.1

[56] References Cited

U.S. PATENT DOCUMENTS

| | | | |
|---|---|---|---|
| 3,587,318 | 6/1971 | Beluyou | 73/204 |
| 3,747,577 | 7/1973 | Mauch et al. | |
| 3,803,913 | 4/1974 | Tracer | 73/204 |
| 4,043,195 | 8/1977 | Hunting | 73/204 |
| 4,058,089 | 11/1977 | Schmidt et al. | |
| 4,334,186 | 6/1982 | Sasayama | 73/204 |
| 4,501,145 | 2/1985 | Boegei | 73/204 |

OTHER PUBLICATIONS

English Abstracts of Japanese Documents 56-51618, 165, P 70, and 55-104538, 27 M 38.

Primary Examiner—Herbert Goldstein
Attorney, Agent, or Firm—Cushman, Darby & Cushman

[57] ABSTRACT

A device for measuring the flow rate of air includes an electric heater arranged in a path of the air flow and a temperature compensation resistor arranged at a distance from the heater in the path of the air flow, the resistance of the resistor being changed according to the temperature of the air. A selective current supply unit supplied the heater with a current having a current value selected from one of two, large and small, current values. A temperature selection unit selects a plurality of temperature values of the electric heater according to the change of the resistance of the temperature compensation resistor. A current value switching unit switches the current level of the selective current supply under the condition that one of the selected temperature values is attained or maintained. The flow rate of the air is measured by a time measurement unit for measuring the time required for the change of temperature between the plurality of temperature values due to the change of the temperature of the electric heater caused by the switching by the current value switching unit.

11 Claims, 18 Drawing Figures

DEVICE FOR MEASURING FLOW RATE OF AIR

BACKGROUND OF THE INVENTION

1. Field of the Invention

The present invention relates to a device for measuring a flow rate of air, for example, measuring a flow rate of intake air to an engine.

2. Description of the Related Art

In the related art, a device has been proposed wherein a flow rate measurement pipe is provided in an air intake pipe of an engine of a vehicle, and an electric heater consisting of a platinum resistor wire and a temperature compensation resistor for detecting a temperature of air are provided in the flow rate measurement pipe, so that a flow rate of intake air is measured with reference to signals output from the flow rate measurement pipe.

Although the structure of this conventional flow rate measuring device is compact and simple, a current must be supplied to the electric heater to maintain it at a constant temperature, and the current value is output as an analog signal corresponding to the flow rate. Therefore, when this output signal is to be converted into a digital signal by a microcomputer and the like, a high precision A/D converter must be used, resulting in a high production cost.

Also, a ripple component due to an irregular air flow rate is superimposed on the output signal. Therefore, when the output signal is directly converted into a digital signal, precision is undesirably degraded due to that ripple component.

SUMMARY OF THE INVENTION

It is therefore an object of the present invention to provide a device for measuring a flow rate of air which is free of problems such as high cost and low measurement precision and can deliver a satisfactory measurement.

According to the present invention, there is provided a device for measuring the flow rate of air including an electric heater arranged in a path of air; a temperature compensation resistor at a distance from the heater in the path of air, the resistance of the resistor being changed according to the temperature of air; a selective current supply unit adapted to supply the heater with a current having a current value selected from one of two, large and small, current values; a temperature selection unit for selecting a plurality of temperature values of the electric heater according to the change in the resistance of the temperature compensation resistor; a current value switching unit for switching the current level of the selective current supply unit under the condition that one of the selected temperature values is attained or maintained; and a time measurement unit for measuring the time required for the change of temperature between the plurality of temperature values due to the change of the temperature of the electric heater caused by the current value switching unit; the time measured by the time measurement unit being the indication of the flow rate of air.

DETAILED DESCRIPTION OF THE PREFERRED EMBODIMENTS

Figure 1:
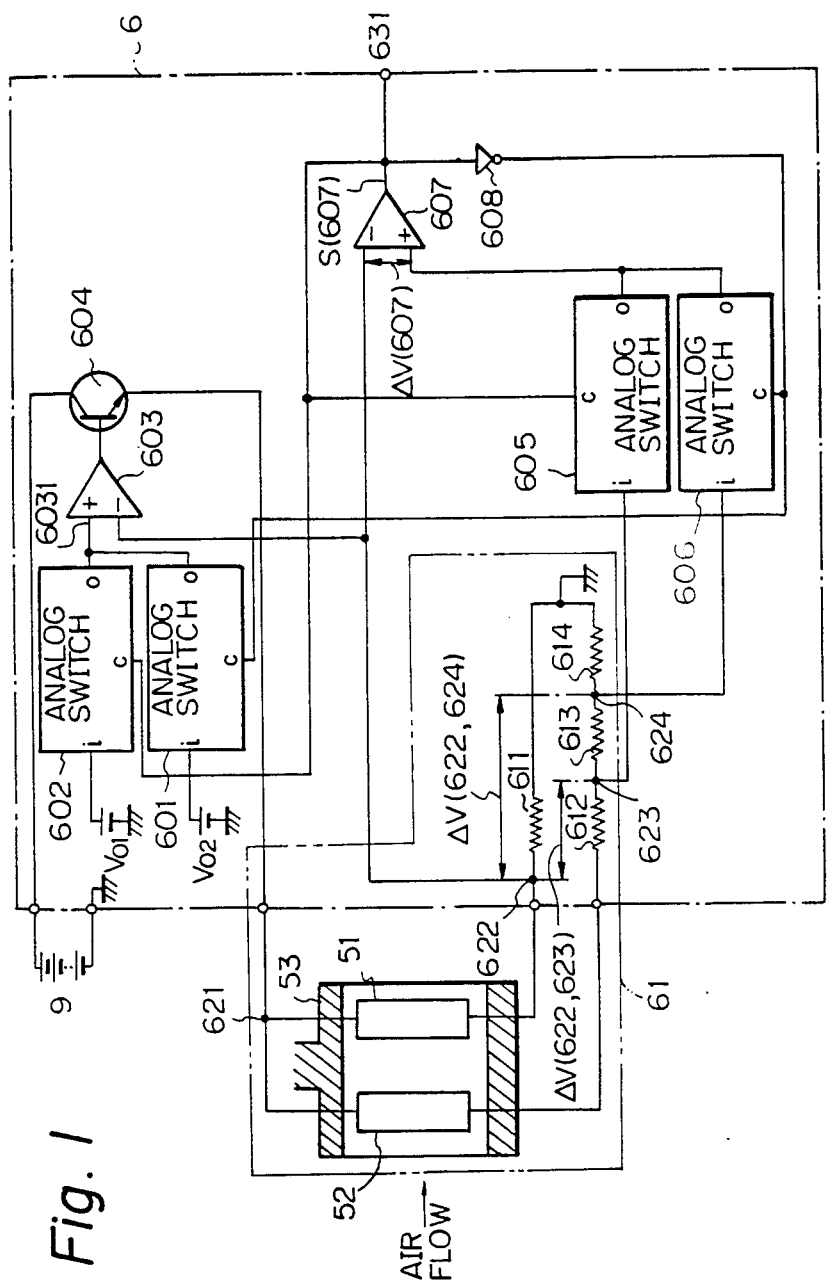
FIG. 1 is a circuit diagram of the overall air flow rate measuring device according to an embodiment of the present invention.
Figure 2:
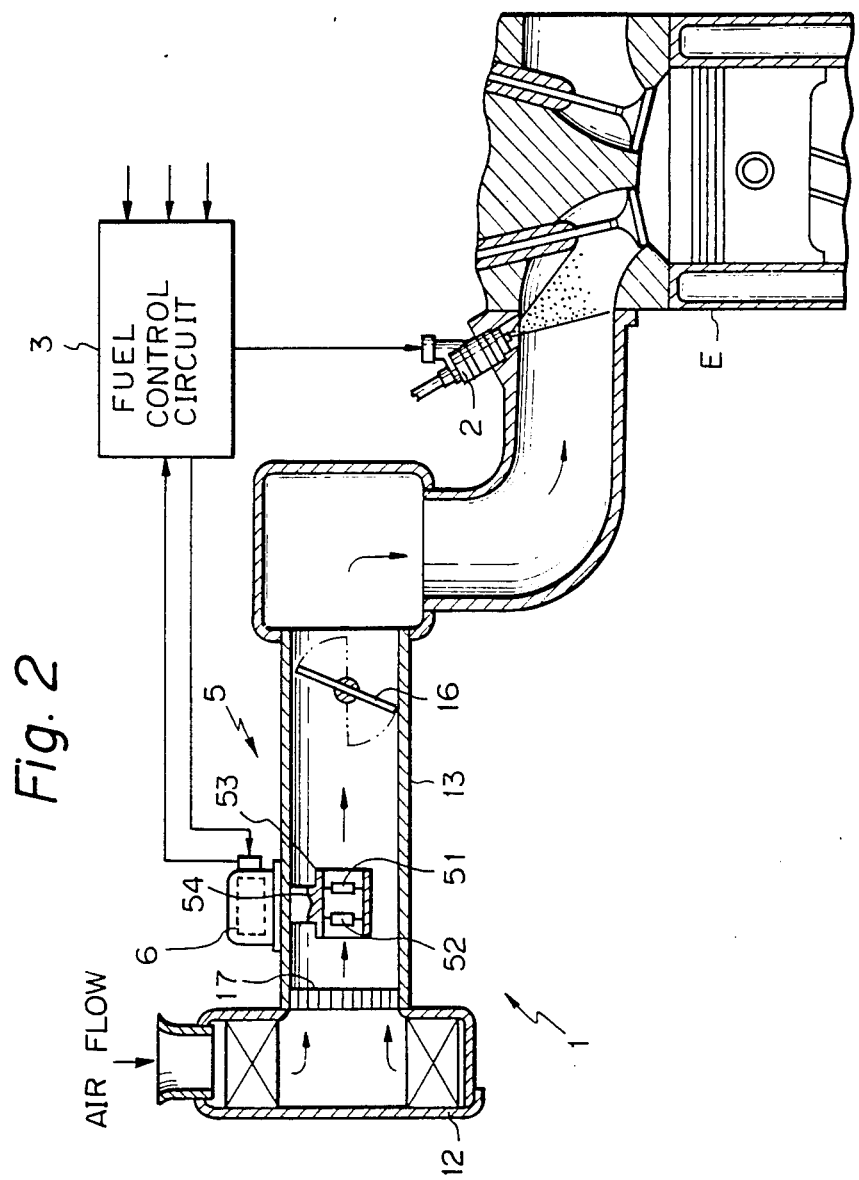
FIG. 2 is a view showing the overall structure of an internal combustion engine in which the air flow rate measuring device of FIG. 1 is used.

FIG. 1 shows a flow rate measuring device according to an embodiment of the present invention, and FIG. 2 shows an engine in which the air flow rate measuring device of FIG. 1 is used. Referring to FIG. 2, an engine E is a spark-ignition engine, and intakes air for combustion through an air cleaner 12, an intake pipe 13, and a throttle valve 16 arranged in an intake path 1. Fuel is injected from an electromagnetic fuel injection valve 2 provided on the intake pipe 13.

The throttle valve 16, which is desirably operated by a driver, is provided in the intake pipe 13, and a rectifier grid 17 for rectifying an air flow is provided at a coupling portion between the intake pipe 13 and the air cleaner 12.

In the intake pipe 13, a flow rate measuring pipe 53 is fixed by a supporting shaft 54 at a portion between the rectifier grid 17 and the throttle valve 16 in such a manner that it is substantially parallel to the axial direction of the intake pipe 13. An electric heater 51 comprising a platinum resistor wire is provided in the flow rate measuring pipe 53, and a temperature compensation resistor 52 consisting of a thin platinum film resistor element is provided at an upstream side position of the electric heater 51, slightly distant therefrom to avoid detecting heat from the electric heater 51.

Figure 3:
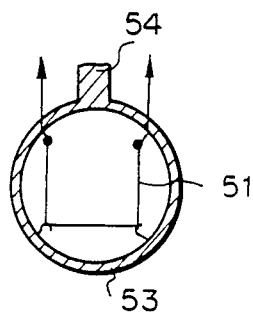
FIG. 3 is a view showing a structure of an electric heater in the device shown in FIG. 1.
Figure 4:
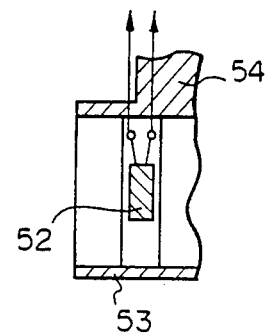
FIG. 4 is a view showing a structure of a temperature compensation resistor in the device of FIG. 1.

The electric heater 51 comprises the platinum resistor wire which is mounted by hooks inside the flow rate measuring pipe 53, as shown in FIG. 3. The thin platinum film resistor element of the temperature compensation resistor 52 is fixed on a stay mounted inside the flow rate measuring pipe 53, as shown in FIG. 4.

In the air flow rate measuring device shown in FIG. 1, a reference voltage $V_{02}$ is applied to an input terminal i of an analog switch 601, and a reference voltage $V_{01}$ is applied to an input terminal i of an analog switch 602. Output terminals o of the analog switches 601 and 602 are commonly connected to a non-inverting input terminal 6031 of an operational amplifier (opamp) 603. An output terminal of the opamp 603 is connected to the base of a power transistor 604. A bridge circuit 61 comprises the electric heater 51, the temperature compensation resistor 52 and resistors 611, 612, 613, and 614, and has a bridge input terminal 621, and bridge output terminals 622, 623, and 624. The emitter of the power transistor 604 is connected to the bridge input terminal 621 of the bridge circuit 61, and the inverting input terminals of the opamp 603 and a comparator 607 are commonly connected to the bridge output terminal 622. Input terminals i of analog switches 605 and 606 are respectively connected to the bridge output terminals 623 and 624 of the bridge circuit 61. In addition, the resistors 611 and 614 are commonly grounded. Output terminals o of the analog switches 605 and 606 are commonly connected to the non-inverting input terminal of the comparator 607. Control terminals C of the analog switches 602 and 605 and an input terminal and a signal output terminal of an inverter 608 are commonly connected to an output terminal of the comparator 607. Control terminals C of the analog switches 601 and 606 are commonly connected to the output terminal of the inverter 608.

The collector of the power transistor 604 is connected to the positive terminal of a battery 9 to supply a current, and the negative terminal of the battery 9 is grounded. Although not shown in FIG. 1, the analog switches 601, 602, 605, and 606, the opamp 604, the comparator 607, and the inverter 608 are powered by the battery 9.

Operation of the device shown in FIG. 1 will be described hereinafter.

A predetermined amount of air determined by an opening of the throttle valve 16 is taken into the engine E through the intake pipe 13 via the air cleaner 12. A constant amount of air in the total intake air passes through the flow rate measuring pipe 53 and is taken into the engine E.

The temperature compensation resistor 52 is located at a position where it is not influenced by heat of the electric heater 51, and thus is influenced only by an air temperature. A temperature of the electric heater 51 is increased when it is supplied with power, but is decreased by the intake air.

Operation of the device shown in FIG. 1 will be described with reference to a timing chart shown in FIG. 5.

An operating state at a time $t_0$ will first be described. At this time, assuming that an output S(607) of the comparator 607 is at LOW level, as shown in FIG. 5(7), the LOW level signal is inverted by the inverter 608, and a HIGH level signal is applied to the control terminal C of the analog switch 601. Thus, the analog switch 601 is in the ON state, and the reference voltage $V_{02}$ is applied to the non-inverting input terminal of the opamp 603 through the analog switch 601, as shown in FIG. 5(5). It should be noted that, since the output S(607) of the comparator 607 is at LOW level at the time $t_0$ as shown in FIG. 5(7) and the LOW level signal is applied to the control terminal C of the analog switch 602, the analog switch 602 is in the OFF state. A circuit consisting of the opamp 603, the power transistor 604, the electric heater 51, and the resistor 611 comprises a constant current circuit, and the constant current circuit is operated so that the voltage across the two ends of the resistor 611 is equal to a voltage V(6031) of the non-inverting input terminal 6031. In this case, a current flowing in the resistor 611 is substantially the same as that flowing in the electric heater 51. Thus, the current $I_h(02)$ flowing in the electric heater 51 is expressed by the following equation:

$$I_h(02) = V_{02}/R_{611} \quad (1)$$

where $R_{611}$ is a resistance of the resistor 611.

Note that the current $I_h(02)$ must be set at a value sufficient to increase a temperature $T_h$ of the electric heater 51 so as to overcome the cooling effect of the intake air. Therefore, the temperature $T_h$ of the electric heater 51 is linearly increased at a given slope in accordance with the time elapsed, as shown in FIG. 5(1).

A resistance $R_h$ of the electric heater 51 has a constant temperature coefficient $K_h$ and varies in accordance with the temperature $T_h$ given in the relationship expressed by the following equation:

$$R_h = R_{h0} \times (1 + K_h \times T_h) \quad (2)$$

Where $R_{h0}$ is a resistance of the electric heater at a temperature of 0° C., and $K_h > 0$.

Therefore, since the voltage V(621) of the bridge input terminal 621 is obtained by adding the voltages across the two ends of the resistor 611 and those of the electric heater 51, this voltage V(621) can be expressed as follows:

$$V(621) = V_{02} + V_{02} \times R_{h0} \times (1 + K_h \times T_h)/R_{611} \quad (3)$$

Figure 5:
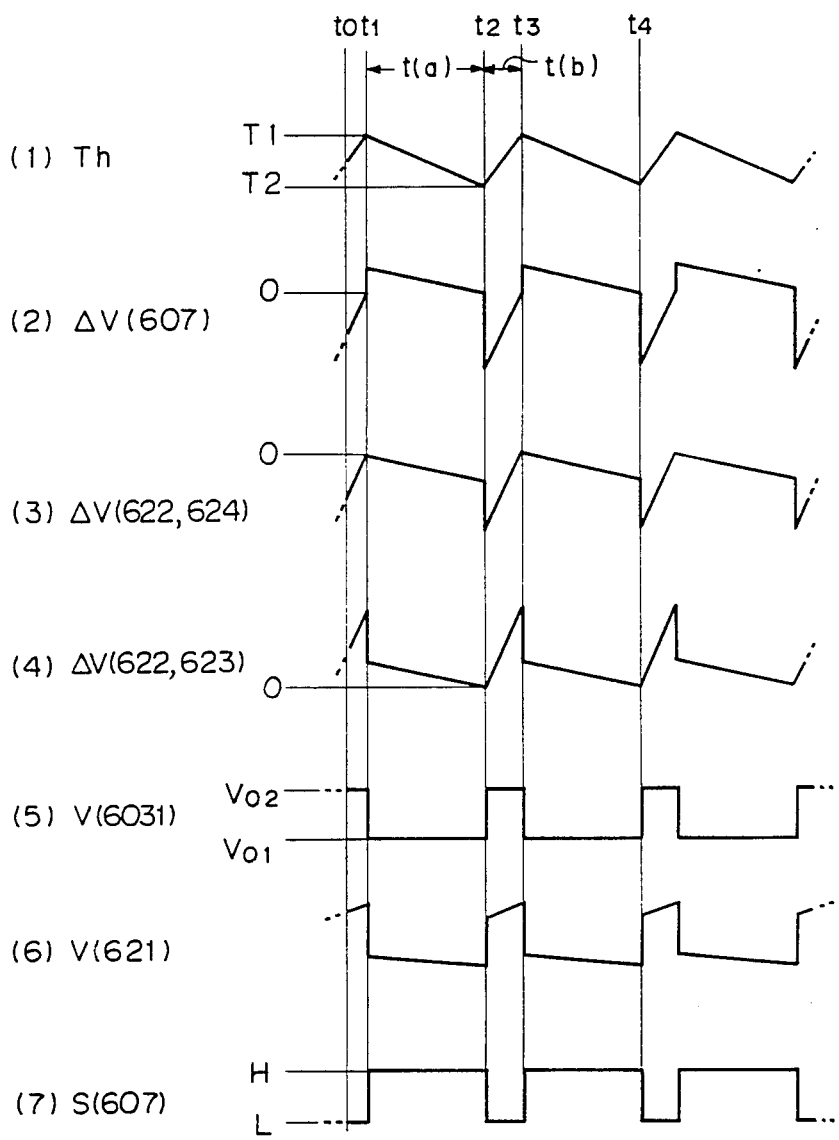
FIG. 5 is a timing chart showing the operation of the device of FIG. 1.

Since the temperature coefficient $K_h°0$ in equation (3), the voltage V(621) of the bridge input terminal 621 is increased in accordance with an increase in the temperature $T_h$ of the electric heater 51, as shown in FIG. 5(6).

The current flowing in the temperature compensation resistor 52 is set to be low by adjusting the resistance of the resistors 612, 613, and 614 in such a manner that a temperature $T_r$ of the temperature compensation resistor 52 does not exceed the air temperature due to heat thereof. Therefore, the temperature $T_r$ of the temperature compensation resistor 52 can be considered as the air temperature. A resistance $R_r$ of the temperature compensation resistor 52 has a constant temperature coefficient $K_r$. The resistance $R_r$ of the temperature compensation resistor 52 considered as an intake air temperature $T_{air}$ can be given by the following equation:

$$R_r = R_{r0} \times (1 + K_r \times T_r) \quad (4)$$

where $R_{r0}$ is a resistance of the temperature compensation resistor 52 at a temperature of 0° C., and $K_r$ is positive.

It should be noted that a voltage $\Delta V(622,624)$ between the bridge output terminals 624 and 622 of the bridge circuit 61 comprising the temperature compensation resistor 52, the electric heater 51, and the resistors 611, 612, 613, and 614 is set to be a negative voltage, as shown in FIG. 5(3).

At the time $t_0$, the output S(607) of the comparator 607 is at LOW level, as shown in FIG. 5(7), the LOW level signal is inverted by the inverter 608, and the inverted signal is applied to the control terminal C of the analog switch 606. Accordingly, the analog switch 606 is in the ON state, and a voltage appearing at the bridge output terminal 624 is applied to the noninverting input terminal of the comparator 607 through the analog switch 606. Therefore, at the time $t_0$, the input voltage $\Delta V(607)$ of the comparator 607 is equal to the voltage $\Delta V(622,624)$ between the bridge output terminals 624 and 622 shown in FIG. 5(3), and is a negative voltage. As a result, the output S(607) of the comparator 607 is maintained at LOW level at the time $t_0$, as shown in FIG. 5(7).

Note that at the time $t_0$, since the output S(607) of the comparator 607 is at LOW level, as shown in FIG. 5(7), and the LOW level signal is applied to the control terminal C of the analog switch 605, the analog switch 605 is in the OFF state.

At a time $t_1$, the temperature $T_h$ of the electric heater 51 is increased to a first preset temperature $T_1$, as shown in FIG. 5(1), and the resistance $R_h$ of the electric heater 51 is increased to a resistance $R_{h1}$ in accordance with an increase in the temperature of the electric heater 51. The resistance $R_{h1}$ can be expressed as follows from equation (2):

$$R_{h1} = R_{h0} \times (1 + K_h \times T_1) \tag{5}$$

Note that resistances $R_{612}$, $R_{613}$, and $R_{614}$ are set in such a manner that the voltage $\Delta V(622,624)$ between the bridge output terminals 624 and 622 becomes 0 V at the time $t_1$, as shown in FIG. 5(3). In other words, since the bridge circuit 61 is balanced at the time $t_1$, the following equation can be established:

$$t_1 \ (R_r + R_{612} + R_{613}) \times R_{611} = R_{h1} \times R_{614} \tag{6}$$

At the time $t_1$, as shown in FIG. 5(3), when the voltage $\Delta V(622,624)$ between the bridge output terminals 624 and 622 exceeds 0 V, as shown in FIG. 5(3), the input voltage $\Delta V(607)$ of the comparator 607, to which the same voltage as the voltage $\Delta V(622,624)$ is applied, also exceeds 0 V, as shown in FIG. 5(2). As a result, at the time $t_1$, the output S(607) of the comparator 607 is changed from LOW level to HIGH level, as shown in FIG. 5(7). In response to this, the analog switch 601 receives the LOW level signal at the control terminal C thereof through the inverter 608 and is turned to the OFF state. Then, since the HIGH level signal is applied to the control terminal C of the analog switch 602, it is turned to the ON state. Accordingly, the reference voltage $V_{01}$ is applied to the non-inverting input terminal 6031 of the opamp 603 instead of the reference voltage $V_{02}$, as shown in FIG. 5(5). In this case, a current flowing in the resistor 611, i.e., a current $I_h(01)$ flowing in the electric heater 51, can be expressed as follows by substituting $V_{01}$ in $V_{02}$ in equation (1):

$$I_h(01) = V_{01}/R_{611} \tag{7}$$

The voltage V(621) of the bridge input terminal 621 can be expressed by substituting $V_{02}$ in $V_{01}$ in equation (3):

$$t_1 \ V(621) = V_{01} \times V_{01} \times R_h0 \times (1 + K_h \times T_h)/R_{611} \tag{8}$$

At the time $t_1$, as shown in FIG. 5(7), the analog switch 606 is turned to an OFF state in correspondence with a change from LOW level to HIGH level, and the analog switch 605 is turned to the ON state. Accordingly, the voltage from the bridge output terminal 623 is applied to the non-inverting input terminal of the comparator 607 through the analog switch 605 instead of the voltage from the bridge output terminal 624. Therefore, as shown in FIG. 5(2), the input voltage $\Delta V(607)$ of the comparator 607 is equal to the voltage $\Delta V(622,623)$ shown in FIG. 5(4) between the bridge output terminals 623 and 622 and becomes a positive voltage after the time $t_1$. As a result, the output S(607) of the comparator 607 is kept at HIGH level after the time $t_1$, as shown in FIG. 5(7).

The reference voltage $V_{01}$ is set so that the current $I_h(01)$ becomes sufficiently low. Thus, a temperature drop caused by the intake air exceeds a temperature rise generated by the electric heater 51 due to the current $I_h(01)$. Therefore, the temperature $T_h$ of the electric heater 51 is linearly decreased at a given slope in accordance with the time elapsed after the time $t_1$, as shown in FIG. 5(1).

At a time $t_2$, the temperature $T_h$ of the electric heater 51 is decreased to a second preset temperature $T_2$, as shown in FIG. 5(1). In accordance with a decrease in the temperature of the electric heater 51, the resistance $R_h$ of the electric heater 51 is decreased to $R_{h2}$. $R_{h2}$ is expressed as follows from equation (2):

$$R_{h2} = R_{h0} \times (1 + K_h \times T_2) \tag{9}$$

As shown in FIG. 5(4), the resistance $R_{612}$, $R_{613}$, and $R_{614}$ of the resistors 612, 613, and 614 are set in such a manner that the voltage $\Delta V(622,623)$ between the bridge output terminals 623 and 622 becomes 0 V at the time $t_2$. In other words, since the bridge circuit 61 is balanced at the time $t_2$, the following equation can be established:

$$(R_r + R_{612}) \times R_{611} = R_{h2} \times (R_{613} + R_{614}) \tag{10}$$

When the voltage $\Delta V(622,623)$ between the bridge output terminals 623 and 622 is lowered below 0 V, as shown in FIG. 5(4), the input voltage $\Delta V(607)$ of the comparator 607 to which the same voltage as the voltage $\Delta V(622,623)$ is applied is also lowered below 0 V, as shown in FIG. 5(2). As a result, at the time $t_2$, the output S(607) of the comparator 607 is changed from HIGH level to LOW level, as shown in FIG. 5(7). In response to this change, the LOW level signal is applied to the control terminal C of the analog switch 602 and turned to the OFF state. Then, the HIGH level signal is applied to the analog switch 601 through the inverter 8 and turned to the ON state. Accordingly, as shown in FIG. 5(5), the reference voltage $V_{02}$ is applied to the non-inverting input terminal 6031 of the opamp 603 in place of the reference voltage $V_{01}$. At this time, the current flowing in the resistor 611, i.e., the current $I_h$ flowing in the electric heater 51, is expressed by equation (1). The voltage V(621) of the bridge input terminal 621 is expressed by equation (3).

At the time $t_2$, in response to the change from HIGH level to LOW level shown in FIG. 5(7), the analog switch 605 is turned to the OFF state and the analog switch 606 is turned to ON state. Therefore, the voltage from the bridge output terminal 624 is applied to the non-inverting input terminal of the comparator 607 through the analog switch 606 instead of the voltage from the bridge output terminal 624. For this reason, after the time $t_2$, the input voltage $\Delta V(607)$ of the comparator 607 becomes equal to the voltage $\Delta V(622,624)$ between the bridge output terminals 624 and 622 and becomes a negative voltage. As a result, the output S(607) from the comparator 607 is kept at LOW level after the time $t_2$, as shown in FIG. 5(7). After the time $t_2$, the current $I_h$ given by equation (1) is allowed to flow in the electric heater 51 again so as to increase the amount of heat, and the temperature $T_h$ of the electric heater 51 is linearly increased at a given slope in accordance with the time elapsed, as shown in FIG. 5(1). At a time $t_3$, the temperature $T_h$ of the electric heater 51 reaches the first preset temperature $T_1$ through the same process as at the time $t_0$.

When the above operation is repeatedly performed, the temperature $T_h$ of the electric heater 51 forms a triangular waveform between the temperatures $T_1$ and $T_2$, as shown in FIG. 5(1). In response to this, a flow rate output signal having a pulse train, in which HIGH and LOW levels alternately appear as shown in FIG. 5(7), is generated from a flow rate signal output terminal 631. Needless to say, a HIGH level interval t(a) of this pulse train corresponds to an interval during which the temperature $T_h$ of the electric heater 51 is decreased, that is, an interval during which the electric heater 51 is cooled by the intake air. A LOW level interval t(b) corresponds to an interval during which the electric heater 51 is heated.

The relationship between the HIGH and LOW level intervals t(a) and t(b) of the flow rate output signal and an intake air amount Q(AIR) will be described hereinafter.

As shown in FIG. 5(1), during the HIGH level interval t(a), the temperature $T_h$ of the electric heater 51 is decreased in accordance with elasped time. Time required for temperature decrease is determined by a ratio wherein the amount of heat accumulated in the electric heater 51 is decreased by a cooling effect of the intake air. The cooling effect becomes large when the intake air amount Q(AIR) is larger, and small when it is smaller.

Figure 6:
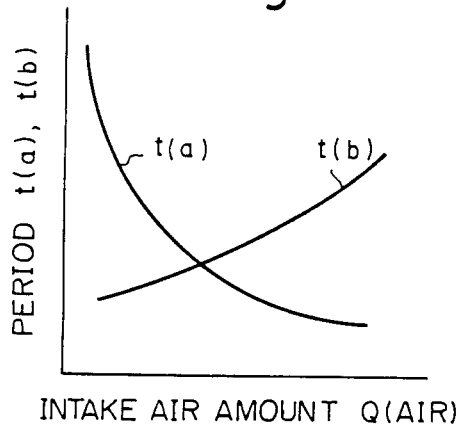
FIG. 6 is a graph showing the relationship between a flow rate output signal and the flow rate of intake air in the device of FIG. 1.

Therefore, when the intake air amount Q(AIR) is large, the temperature $T_h$ of the electric heater 51 is decreased rapidly, and the HIGH level interval t(a) becomes short. Conversely, when the intake air amount Q(AIR) is small, the HIGH level interval t(a) becomes long. FIG. 6 shows the flow rate characteristics in the interval t(a). In this case, the electric heater 51 is kept cooled during the HIGH level interval t(a). Even when the intake air flow becomes irregular, a flow rate of air which passes near the electric heater 51 and changes over a period of time promotes a decrease in the temperature $T_h$ of the electric heater 51, and during the HIGH level interval t(a), the flow rate which changes over a period of time is integrated as a decrease of the temperature $T_h$ of the electric heater 51. Therefore, the value of the HIGH level interval t(a) corresponds to an approximate average value of the intake air amount Q(AIR) during the HIGH level interval t(a). With this integration, a ripple component due to irregular air flow can be removed. Accordingly, when the air flow amount Q(AIR) is obtained in accordance with the flow rate characteristics in the interval t(a) shown in FIG. 6, a stable flow rate without the ripple component is calculated.

When the flow rate of air is obtained from a pulse width of the flow rate output signal corresponding to the HIGH level interval, since the pulse width becomes small in accordance with an increase in the flow rate, the relationship between the flow rate and the output pulse width is approximate to a hyperbolic function. Therefore, even when the flow rate of air is low, detection precision will not be degraded, thus providing a highly precise flow rate signal even in an engine idling state.

A case will be described hereinafter wherein the intake air flow Q(AIR) can be also obtained from the LOW level interval t(b).

As shown in FIG. 5(1), during the LOW level interval t(b), the temperature $T_h$ of the electric heater 51 is increased in accordance with the time elapsed. The time required for the temperature $T_h$ to increase is determined by the rate of increase of the temperature $T_h$ due to the amount of heat obtained by the current $I_h$ supplied to the electric heater 51 and the rate of decrease of the temperature $T_h$ due to the cooling effect of the intake air. When the intake air amount Q(AIR) is large, the temperature $T_h$ of the electric heater 51 increases slowly, since most of the heat of the electric heater 51 is dissipated by a cooling effect. On the other hand, when the intake air amount is small, the temperature $T_h$ increases rapidly, since only a small amount of the heat of the electric heater 51 is dissipated.

Therefore, when the intake air amount Q(AIR) is large, since the temperature $T_h$ of the electric heater 51 increases slowly, the LOW level interval t(b) is long. Conversely, when the intake air amount Q(AIR) is small, the LOW level interval t(b) becomes short. FIG. 6 shows the flow rate characteristics in the interval t(b). As can be seen from FIG. 6, the flow rate characteristics in the interval t(b) are the reverse of those in the interval t(a).

When the intake air amount Q(AIR) is obtained from the LOW level interval t(b) in accordance with the flow rate characteristics of t(b) shown in FIG. 6, a stable air flow rate from which the ripple component is eliminated can be obtained for the same reason as in the case of the HIGH level interval t(a).

When the intake air temperature $T_{air}$ is changed, the temperature must be compensated so as not to change the flow rate characteristics shown in FIG. 6. The temperature compensation resistor 52 is provided for performing temperature compensation, and constitutes the bridge circuit 61 together with the electric heater 51. The temperature compensation mechanism will be described hereinafter.

A principle of the temperature compensation mechanism is that constants of elements constituting the bridge circuit 61 must be set to satisfy the following two conditions:

A condition where a difference $(T_2 - T_{air})$ between preset temperature $T_2$ and the intake air temperature $T_{air}$ is not changed even when the temperature $T_{air}$ is changed, i.e.:

$$T_2 - T_{air} = \text{const} \tag{11}$$

A condition where a difference $(T_1 - T_2)$ between the two preset temperatures $T_1$ and $T_2$ is not changed, i.e.:

$$T_1 - T_2 = \text{const} \tag{12}$$

$(T_2 - T_{air})$ is set to be constant because the coefficient of thermal conductivity between the electric heater 51 and the intake air must be constant. On the other hand, $(T_1 - T_2)$ is set to be constant because the total heat amount conducted from the electric heater 51 to the intake air must be constant during the interval t(a) or t(b). When the coefficient thermal conductivity and the total heat amount are set to be constant, the interval t(a) or t(b) is not changed even if the intake air temperature $T_{air}$ is changed, thus compensating for the temperature characteristics. Constants of the elements constituting the bridge circuit 61 which satisfy equations (11) and (12) will be described hereinafter. A condition for equation (11) will first be explained. Namely, a condition which is established when the temperature $T_h$ of the electric heater 51 reaches the second preset temperature $T_2$ is given by equations (9) and (10):

$$R_{h2} = R_{h0} \times (1 + K_h \times T_2) \tag{9}$$

$$(R_h + R_{612}) \times R_{611} = R_{h2} \times (R_{613} + R_{614}) \tag{10}$$

$R_r$ can be given by equation (4):

$$R_r = R_{r0} \times (1 + K_r \times T_{air}) \tag{4}$$

Equations (4) and (9) are substituted for equation (10) so as to eliminate $R_r$ and $R_{h2}$, thus obtaining the following equation:

$$T_2 = [\{R_{r0} \times (1 + K_r \times T_{air}) + R_{612}\} \times \tag{13}$$

$$R_{611} - R_{h0} \times (R_{613} + R_{614})]/\{R_{h0} \times K_h \times (R_{613} + R_{614})\}$$

Equation (13) is substituted for equation (11) so as to eliminate $T_2$, and considering the numerator thereof, the following equation can be obtained:

$$\{R_{r0} \times K_r \times R_{611} - R_{ho} \times K_h \times (R_{613} + R_{614})\} \times \tag{14}$$

$$T_{air} + (R_{r0} + R_{612}) \times R_{611} - (R_{613} + R_{614}) \times$$

$$R_{h0} = \text{const}$$

In equation (14), since the right side is constant, the left side must be constant. However, since the intake air temperature $T_{air}$ is a variable, a coefficient of $T_{air}$ must be 0. That is:

$$R_{r0} \times K_r \times R_{611} - R_{h0} \times K_h \times (R_{613} + R_{614}) = 0 \tag{15}$$

Equation (15) can be rewritten as follows:

$$(R_{r0} \times K_r)/(R_{ho} \times K_r) = (R_{613} + R_{614})/R_{611} \tag{16}$$

From equation (16), a ratio of a value $(R_{h0} \times K_h)$ obtained by multiplying the resistance $R_{h0}$ of the electric heater 51 at 0° C. with the temperature coefficient $K_r$ to a value $(R_{r0} \times K_r)$ obtained by multiplying the resistance $R_{r0}$ of the temperature compensation resistor 52 at 0° C. with the temperature coefficient $K_r$ can be set to be equal to a ratio of the resistance $R_{611}$ of the resistor 611 to a value $(R_{613} + R_{614})$ obtained by adding the resistances of the resistors 613 and 614. Thus, equation (11) can be satisfied regardless of the intake air temperature $T_{air}$.

A condition of equation (12) will be explained.

A condition which is established when the temperature $T_h$ of the electric heater 51 reaches the first preset temperature $T_1$ is given by equations (5) and (6):

$$R_{h1} = R_{h0} \times (1 + K_h \times T_1) \tag{5}$$

$$(R_r + R_{612} + R_{613}) \times R_{611} = R_{h1} \times R_{614} \tag{6}$$

Equations (4) and (5) are substituted for equation (6), to eliminate $R_r$ and $R_{h1}$, thus obtaining the following equation:

$$T_1 = [\{R_{r0} \times (1 + K_r \times T_{air}) + R_{612} + \tag{17}$$

$$R_{613}\} \times R_{611} - R_{h0} \times R_{614}]/(R_{h0} \times K_h \times R_{614})$$

Equations (13) and (17) are substituted for equation (12), to eliminate $T_1$ and $T_2$, thus obtaining the following equation:

$$[(R_{611} \times R_{613})/\{(R_{h0} \times K_h \times R_{614} \times (R_{613} + R_{614})\}] \times \tag{18}$$

$$\{(R_{612} + R_{613} + R_{614} + R_{r0}) + R_{r0} \times K_r \times T_{air}\} = \text{const}$$

From equation (18), even when the intake air temperature $T_{air}$ is changed, if the term $(R_{r0} \times K_r \times T_{air})$ is set to be very much smaller than the term $(R_{612} + R_{613} + R_{614} + R_{r0})$, the left side of equation (18) can be considered as constant. Therefore, equation (12) can be satisfied.

As is apparent from the above explanation of the temperature compensation conditions, when the constants of the elements constituting the bridge circuit 61 are set in accordance with equations (16) and (18), even when the intake air temperature $T_{air}$ is changed, the flow rate characteristics shown in FIG. 6 are not changed, and the temperature characteristic can be compensated.

The digital flow rate output signal generated from the flow rate signal output terminal 631 of the air flow rate measuring device of the present invention is supplied to a fuel control circuit 3, as shown in FIG. 2, and the intake air amount Q(AIR) is calculated from the HIGH or LOW level interval t(a) or t(b) of the flow rate output signal in accordance with the flow rate characteristics shown in FIG. 6. The fuel control circuit 3 generates an injection pulse signal for opening a fuel injection valve 2 in accordance with the calculated intake air amount Q(AIR). Thus, precise amounts of air and fuel having a proper air/fuel ratio are supplied to the engine E, improving the cleaning property of the exhaust gas, the engine power, and the fuel consumption efficiency. As shown in FIG. 1, since the bridge circuit 61 is comprised by the elements including the electric heater 51 and the temperature compensation resistor 52, the temperature compensation conditions are determined only by the elements comprising bridge circuit 61 as in equations (16) and (18), resulting in easy adjustment for temperature compensation.

Figure 7:
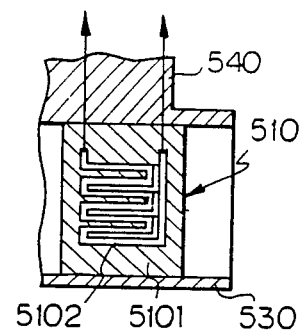
FIG. 7 is a view showing another electric heater which can be used in the device of FIG. 1.

Note that, in the device of FIG. 1, a platinum wire resistor is used in the electric heater 51. However, as shown in FIG. 7, an electric heater 510 in which a thin film resistor 5102 of a material such as platinum, nickel chrome, copper, nickel, or the like is formed on an electrically insulating substrate 5101 can be arranged inside the flow rate measuring pipe 530 in such a manner that it is parallel to the air flow, and the flow rate measurement can be performed in the same manner as when the platinum wire resistor is used.

Figure 8:
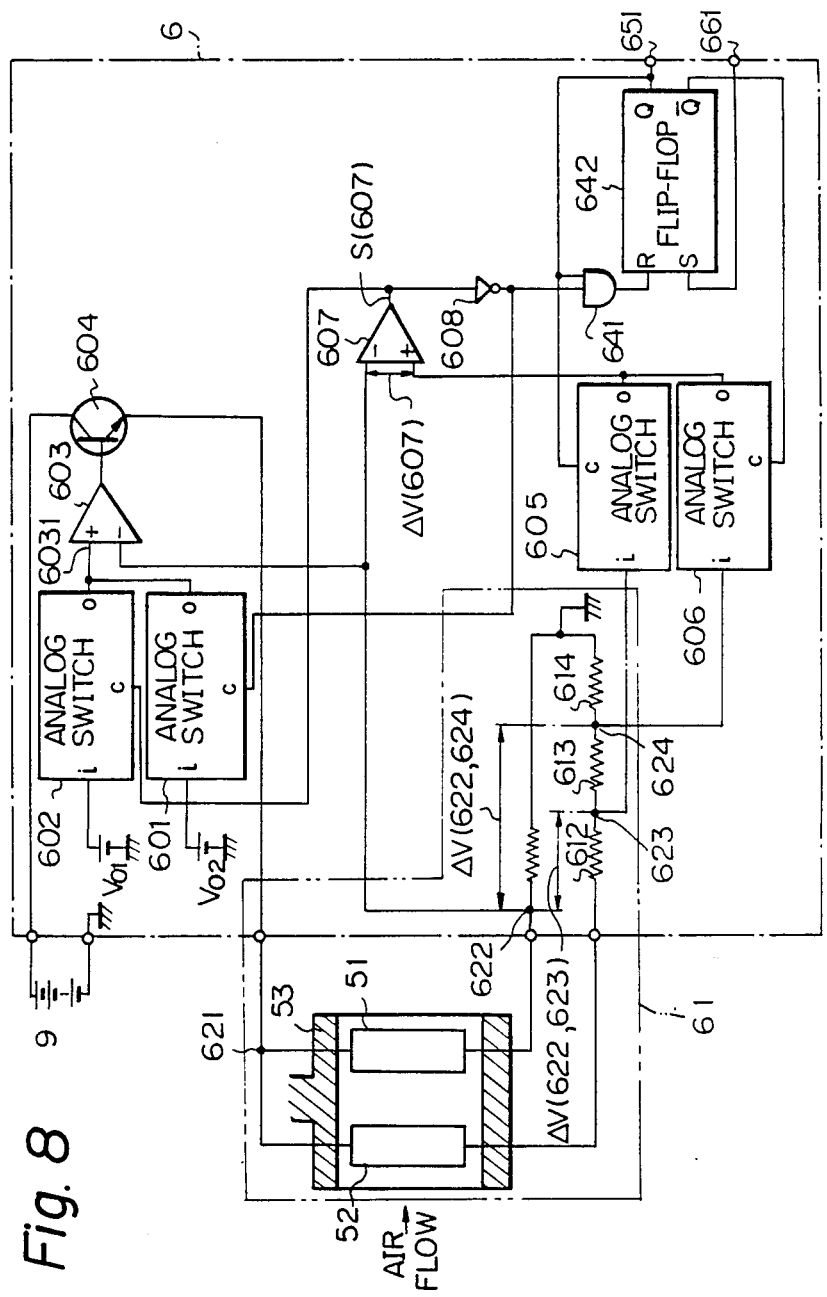
FIG. 8 is a view showing another embodiment of the present invention.

FIG. 8 shows an air flow measuring device according to another embodiment of the present invention. Unlike the device shown in FIG. 1, the device shown in FIG. 8 has an AND gate 641, an RS-flip-flop 642, a flow rate output signal terminal 651, and a start signal input terminal 661. One input terminal of the AND gate 641 is connected to an output terminal of an inverter 608. The other input terminal of the AND gate 641 is connected to a node between a Q output terminal of the flip-flop 642 and the flow rate signal output terminal 651 and is connected to a control terminal C of an analog switch 605. An R input terminal of the flip-flop 642 is connected to the output terminal of the AND gate 641, and an S input terminal thereof is connected to the start signal input terminal 661. A $\overline{Q}$ output terminal of the flip-flop 642 is connected to a control terminal C of the analog switch 606.

Operation of the air flow rate measuring device of FIG. 8 will be described with reference to the timing chart shown in FIG. 9.

An operating state at a time $t_0$ will be described. At this time, when a Q output signal S(642,Q) of the flip-flop 642 is at LOW level, the LOW level signal is supplied to the control terminal C of the analog switch 605, and the analog switch 605 is thus in the OFF state. A logic level of the $\overline{Q}$ output terminal of the flip-flop 642 is at HIGH level, and the HIGH level signal is applied to the control terminal C of the analog switch 606, and the analog switch 606 is in the ON state. For this reason, a voltage from a bridge output terminal 624 of a bridge circuit 61 is applied to a non-inverting input terminal of a comparator 607. An input voltage $\Delta V(607)$ becomes equal to a voltage $\Delta V(622,624)$ between the bridge output terminals 624 and 622 shown in FIG. 9 (3), as shown in FIG. 9(2), and is about 0 V. The voltage $\Delta V(622,624)$ is about 0 V because the temperature $T_h$ of the electric heater 51 is equal to the first preset temperature $T_1$ at the time $t_0$, as shown in FIG. 9(1), and the bridge circuit 61 is set so that it satisfies the balance condition in equation (6) at this time.

At the time $t_0$, when the temperature $T_h$ of the electric heater 51 becomes slightly lower than the first preset temperature $T_1$, the input voltage $\Delta V(607)$ of the comparator 607 becomes negative, and therefore, an output level of the comparator 607 is changed from HIGH level to LOW level. In response to this level change, the analog switch 602 is turned to the OFF state, and the analog switch 601 is turned to the ON state. For this reason, the voltage V(6031) appearing at the non-inverting input terminal 6031 of opamp 603 is changed from the reference voltage $V_{01}$ to $V_{02}$, as shown in FIG. 9(5). In response to this, the current $I_h$ is increased in accordance with equation (1), thus generating heat. When a short time has elapsed from the time $t_0$, the temperature $T_h$ of the electric heater 51 becomes slightly higher than the first preset temperature $T_1$, and the input voltage $\Delta V(607)$ of the comparator 607 becomes positive. Thus, the output S(607) of the comparator 607 is changed from LOW level to HIGH level. In response to this, since the analog switch 601 is turned to the OFF state and the analog switch 602 is turned to the ON state, the voltage V(6031) of the non-inverting input terminal 6031 of the opamp 603 is changed from the reference voltage $V_{02}$ to $V_{01}$, as shown in FIG. 9(5). Then, the current $I_h$ is decreased in accordance with equation (7), thus decreasing the heat. When a further time has elapsed, the temperature $T_h$ of the electric heater 51 becomes slightly lower than the first preset temperature $T_1$. When the above operations are repeated, the output S(607) of the comparator 607 alternates between HIGH and LOW levels at high speed, as shown in FIG. 9(6), and the voltage $\Delta V(622,624)$ between the bridge output terminals 624 and 622 is kept at about 0 V as shown in FIG. 9(3), thus maintaining the balance condition (equation (6)) of the bridge circuit 61.

Figure 9:
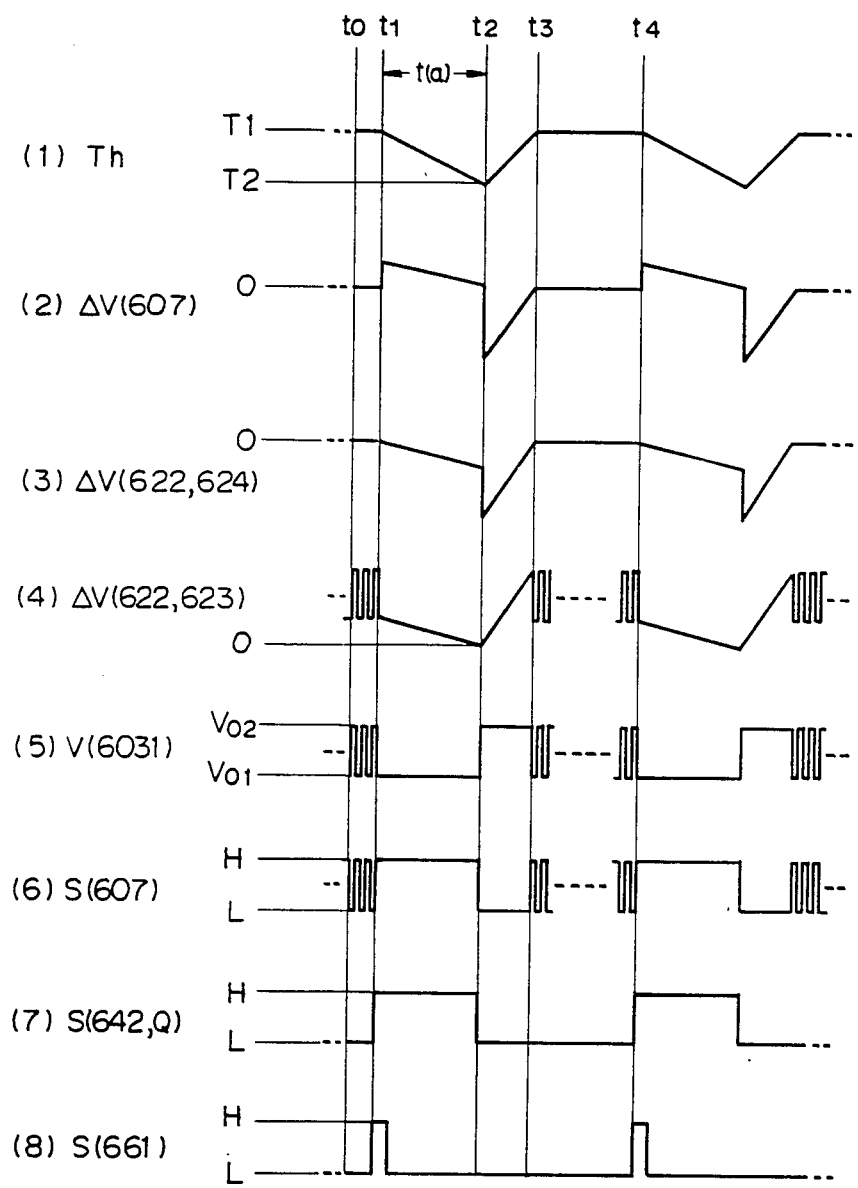
FIG. 9 is a timing chart showing the operation of the device of FIG. 8.

At a time $t_1$, a start signal shown in FIG. 9(8) is supplied to the start signal input terminal 651 from the fuel control circuit 3. The flip-flop 642 is reset in synchronism with a leading edge from LOW level to HIGH level of the start signal, and the Q output terminal signal S(642,Q) thereof is changed from LOW level to HIGH level as shown in FIG. 9(7). In response to this, the analog switch 606 is turned to the OFF state, and the analog switch 605 is turned to the ON state. Thus, the same voltage as the positive voltage $\Delta V(622,623)$ between the bridge output terminals 623 and 622 is applied to the comparator 607 as the input voltage $\Delta V(607)$. As a result, the level of the output terminal of the comparator 607 is stabilized at HIGH level, as shown in FIG. 9(6). In response to this, the analog switch 601 is turned to the OFF state and the analog switch 602 is turned to the ON state. Thus, the voltage V(6031) of the non-inverting input terminal 6031 of the opamp 603 is stabilized at a level of the reference voltage $V_{01}$, as shown in FIG. 9(5).

When the reference voltage $V_{01}$ is applied to the terminal 6031, the temperature $T_h$ of the electric heater 51 is linearly decreased at a given slope in accordance with the time elapsed, as shown in FIG. 9(1), in the same manner as in the embodiment shown in FIGS. 1 and 5.

At a time $t_2$, the temperature $T_h$ of the electric heater 51 is decreased to the second preset temperature $T_2$, as shown in FIG. 9(1), and the bridge circuit 61 is balanced at the time $t_2$ in the same manner as in the embodiment shown in FIGS. 1 and 5, thus establishing equation (10). As shown in FIG. 9(4), the voltage $\Delta V(622,623)$ between the bridge output terminals 623 and 622 is decreased below 0 V. Therefore, the input voltage $\Delta V(607)$ of the comparator 607 to which the same voltage as the voltage $\Delta V(622,623)$ is applied becomes lower than 0 V, as shown in FIG. 9(2). As a result, at the time $t_2$, the output S(607) of the comparator 607 is changed from HIGH level to LOW level, as shown in FIG. 9(6). In response to this, the output from the inverter 608 is changed from LOW level to HIGH level and is applied to one input terminal of the AND gate 641. In this case, the HIGH level signal from the Q output terminal of the flip-flop 642 is applied to the other input terminal of the AND gate 641. Therefore, at the time $t_2$, when the two HIGH level signals applied to the input terminals of the AND gate 641 are ANDed, the output of the AND gate 641 is changed from LOW level to HIGH level, and the HIGH level signal is applied to the R input terminal of the flip-flop 642. Thus, the flip-flop 642 is reset, and the Q output signal S(642,Q) thereof is changed from HIGH level to LOW level at the time $t_2$, as shown in FIG. 9(7).

At the time $t_2$, since the analog switch 605 is turned to the OFF state and the analog switch 606 is turned to the ON state, in response to a change in logic level of the Q output signal S(642,Q) of the flip-flop 642 from HIGH level to LOW level, the same voltage as the voltage $\Delta V(622,624)$ between the bridge output terminals 624 and 622 is applied to the comparator 607 as the input voltage $\Delta V(607)$, instead of the voltage $\Delta V(622,623)$ between the bridge output terminals 622 and 623.

At the time $t_2$, since the analog switch 602 is turned to the OFF state and the analog switch 601 is turned to the ON state, the voltage V(6031) of the non-inverting input terminal 6031 of the opamp 603 is changed from the reference voltage $V_{01}$ to $V_{02}$, as shown in FIG. 9(5). When the reference voltage $V_{02}$ is further kept applied to the terminal 6031, the temperature $T_h$ of the electric heater 51 is increased at a given slope in accordance with the time elapsed, as shown in FIG. 9(1), in the same manner as in the embodiment shown in FIGS. 1 and 5.

At a time $t_3$, as shown in FIG. 9(1), the temperature $T_h$ of the electric heater 51 reaches the first preset temperature $T_1$.

After the time $t_3$, the same operation as that at the time $t_0$ is repeated, and the output S(607) of the comparator 607 alternates between HIGH and LOW levels at high speed, and the temperature $T_h$ of the electric heater 51 is kept at the first preset temperature $T_1$, as shown in FIG. 9(1).

When the above operations are repeated, the temperature $T_h$ of the electric heater 51 is maintained at the first preset temperature $T_1$ before the start signal is applied to the start signal input terminal 661, and immediately after the start signal is applied thereto, it begins to decrease. Immediately after the temperature $T_h$ reaches the second preset temperature $T_2$, it is increased again. Thus, when the temperature $T_h$ reaches the first preset temperature $T_1$, it is maintained at the first preset temperature $T_1$ until the start signal is applied again. In response to such changes in the temperature $T_h$ of the electric heater 51, a pulse having a predetermined HIGH level interval is generated from the flow rate signal output terminal 651, as shown in FIG. 9(7).

As is clearly understood, the HIGH level interval t(a) of this pulse corresponds to an interval during which the temperature $T_h$ of the electric heater 51 is decreased, that is, an interval during which the electric heater 51 is cooled by the intake air.

The relationship between the HIGH level interval t(a) of the flow rate output signal and the intake air amount Q(AIR) is obviously equal to the flow rate characteristics in the interval t(a) shown in FIG. 6.

Unlike the device shown in FIG. 1, in the device shown in FIG. 8, a measurement start time, e.g., the time $t_1$, can be determined by the start signal generated from the fuel control circuit 3.

When the time $t_1$ is synchronized with, for example, a rotational angle of a crankshaft of the engine E, changes in the air flow rate over a period of time in the intake pipe, periodically caused due to the engine E, effectively influence the air flow rate measuring device of the present invention, thus generating a stable flow rate output signal. In this manner, a so-called engine revolution synchronous sampling operation of the intake air amount Q(AIR) can be performed, thereby generating a highly precise and stable air flow rate signal.

Figure 10:
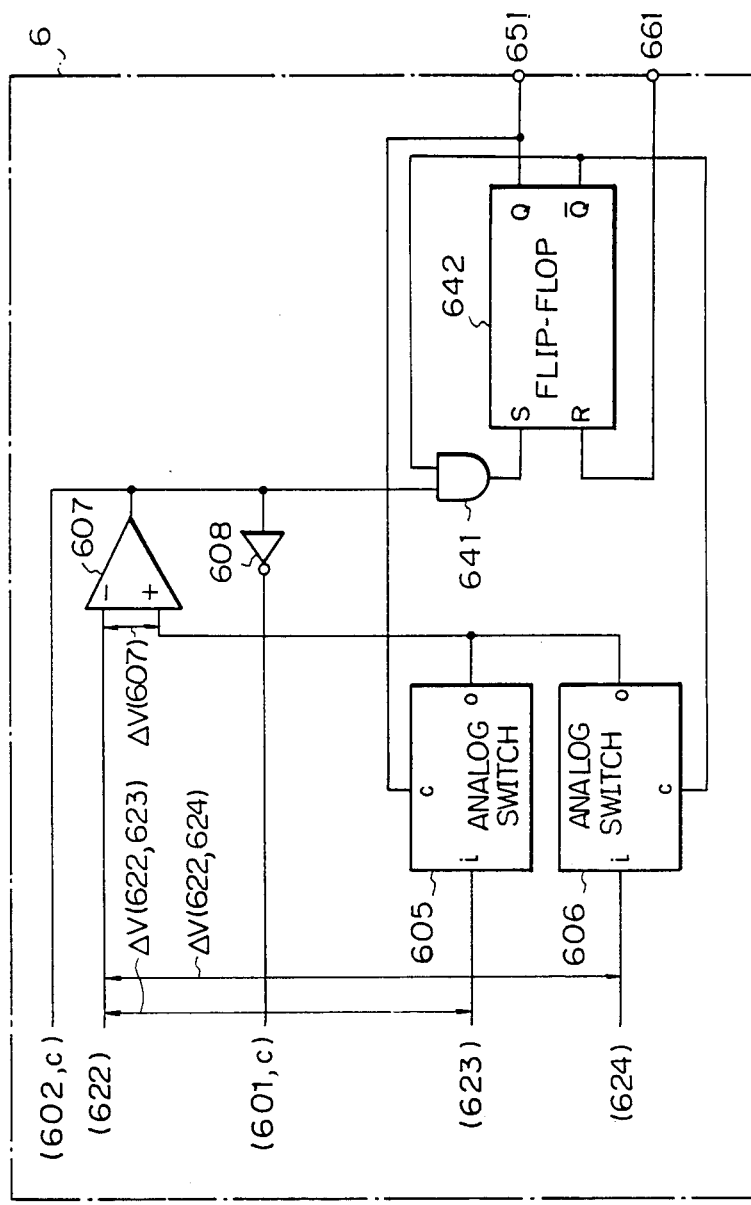
FIG. 10 is a view showing still another embodiment of the present invention.

FIG. 10 shows a sensor control circuit of an air flow rate measuring device according to still another embodiment of the present invention. It should be noted that the same parts as in FIG. 8 are omitted, and only different parts are shown in FIG. 10.

Unlike the device shown in FIG. 8, in the device shown in FIG. 10, one input terminal of an AND gate 641 is directly connected to an output terminal of a comparator 607, and the other input terminal thereof is connected to a $\overline{Q}$ output terminal of a flip-flop 642. The output terminal of the AND gate 641 is connected to the S input terminal of the flip-flop 642, and the R input terminal of the flip-flop 642 is connected to a start signal input terminal 661.

Operation of the air flow rate measuring device shown in FIG. 10 will be described with reference to the timing chart shown in FIG. 11.

An operating state at a time $t_0$ will first be described. At the time $t_0$, assuming that a Q output S(642,Q) of the flip-flop 642 is at HIGH level as shown in FIG. 11(7), since the HIGH level signal is applied to a control terminal C of the analog switch 605, the analog switch 605 is in the ON state. Since a $\overline{Q}$ output S(642,$\overline{Q}$) of the flip-flop 642 is obviously at LOW level, the LOW level signal is applied to a control terminal C of the analog switch 606, and therefore, the analog switch 606 is in the OFF state. Thus, a voltage appearing at the bridge output terminal 623 of the bridge circuit 61 is applied to the non-inverting input terminal of the comparator 607 via the analog switch 605. Therefore, at the time $t_0$, the input voltage $\Delta V(607)$ of the comparator 607 becomes equal to the voltage $\Delta V(622,623)$ between the bridge output terminal 623 and 622, i.e., about 0 V.

Figure 11:
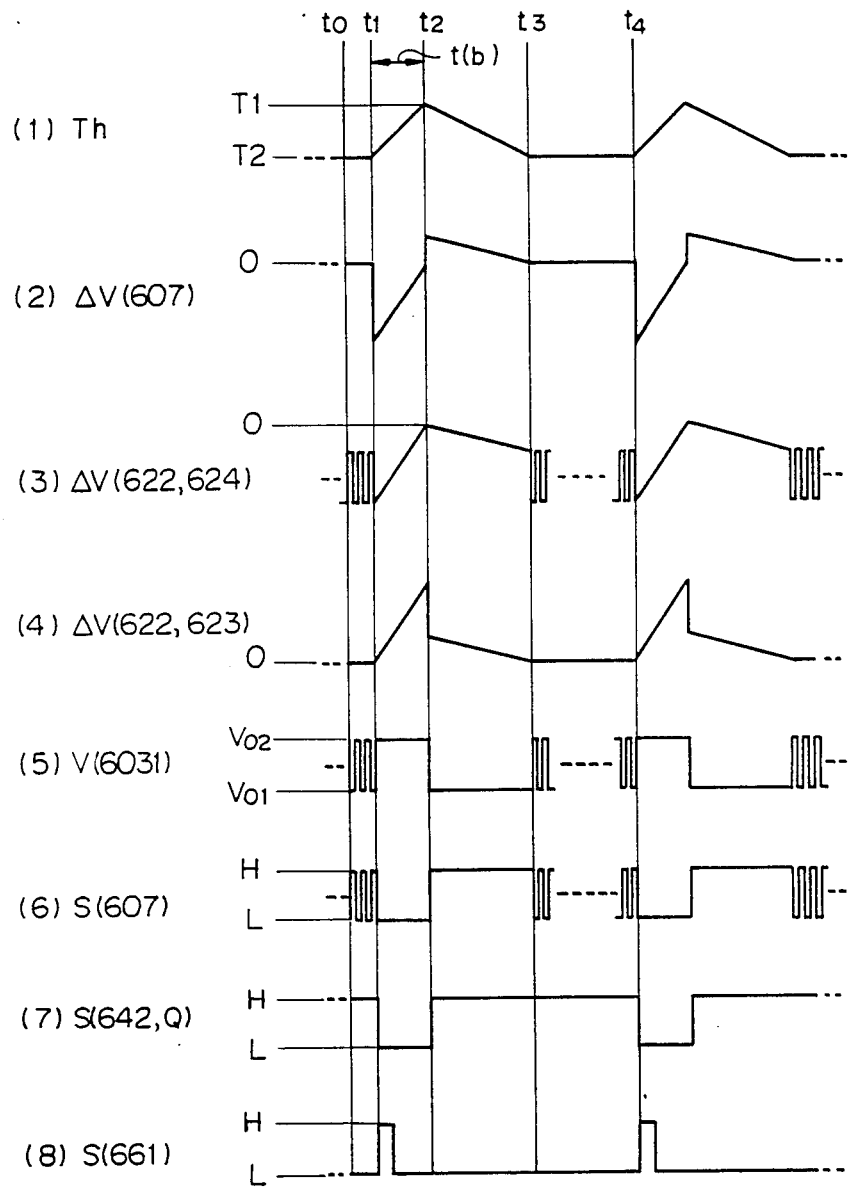
FIG. 11 is a timing chart showing the operation of the device in FIG. 10.

The voltage $\Delta V(622,623)$ between the bridge output terminals 623 and 622 is about 0 V because the temperature $T_h$ of the electric heater 51 is the same as the second preset temperature $T_2$ at the time $t_0$, as shown in FIG. 11(1), and the bridge circuit 61 is set so that it satisfies the balance condition in equation (10) at this time. At the time $t_0$, when the temperature $T_h$ is slightly changed from the second preset temperature $T_2$, the sensor control circuit 6 is operated to compensate for this change in the same manner as in the embodiment shown in FIG. 8 at the time $t_0$. As shown in FIG. 11(6), the output S(607) of the comparator 607 alternates between HIGH and LOW levels at high speed, and the voltage $\Delta V(622,623)$ between the bridge output terminals 623 and 622 is maintained at about 0 V, as shown in FIG. 11(4), thus keeping the balance condition (equation (10)) of the bridge circuit 61. As a result, the temperature $T_h$ of the electric heater 51 is kept at the second temperature $T_2$, as shown in FIG. 11(1).

At a time $t_1$, a start signal shown in FIG. 11(8) is supplied to the start signal input terminal 661 from the fuel control circuit 3. The flip-flop 642 is reset in synchronism with a leading edge from LOW level to HIGH level of the start signal, and the Q output S(642,Q) of the flip-flop 642 is changed from HIGH level to LOW level, as shown in FIG. 11(7). In response to this, the analog switch 605 is turned to the OFF state, and the analog switch 606 is turned to the ON state. As shown in FIGS. 11(2) and 11(3), the same voltage as the negative voltage $\Delta V(622,624)$ between the bridge output terminals 624 and 622 is applied as the input voltage $\Delta V(607)$ of the comparator 607, and the output S(607) thereof is stabilized at LOW level, as shown in FIG. 11(6). In response to this level, the analog switch 602 is turned to the OFF state, and the analog switch 601 is turned to the ON state. For this reason, the voltage V(6031) at the non-inverting input terminal 6031 of the opamp 603 is stabilized at the level of the reference voltage $V_{02}$, as shown in FIG. 11(5).

In the state wherein the reference voltage $V_{02}$ is applied to the terminal 6031, the temperature $T_h$ of the electric heater 51 is linearly increased at a given slope in accordance with the time elapsed, as shown in FIG. 11(1), in the same manner as in the device shown in FIG. 1.

At a time $t_2$, the temperature $T_h$ of the electric heater 51 is increased to the first preset temperature $T_1$, as shown in FIG. 11(1), and the bridge circuit 61 is balanced at the time $t_2$ in the same manner as in the device of FIG. 1, thus establishing equation (6). As shown in FIG. 11(3), the voltage ΔV(622,624) between the bridge output terminals 624 and 622 is decreased below 0 V, as shown in FIG. 11(3). The input voltage ΔV(607) of the comparator 607 to which the same voltage as the voltage ΔV(622,624) is applied is also decreased below 0 V, as shown in FIG. 11(2). As a result, at the time $t_2$, the output S(607) of the comparator 607 is changed from LOW level to HIGH level, as shown in FIG. 11(6). The HIGH level signal is supplied to one input terminal of the AND gate 641, the other input terminal of which receives the HIGH level signal from the $\overline{Q}$ output S(642,$\overline{Q}$) of the flip-flop 642. Therefore, at the time $t_2$, when the two HIGH level signals applied to the input terminals of the AND gate 641 are ANDed, the output level of the AND gate 641 is changed from LOW level to HIGH level, and the HIGH level signal is supplied to the S input terminal of the flip-flop 642, thereby setting it. As shown in FIG. 11(7), at the time $t_2$, the Q output S(642,Q) of the flip-flop 642 is changed from LOW level to HIGH level.

At the time $t_2$, in response to a change in the Q output S(642,Q) of the flip-flop 642 shown in FIG. 11(7) from LOW level to HIGH level, the analog switch 605 is turned to the ON state, and the analog switch 606 is turned to the OFF state. Accordingly, instead of the voltage ΔV(622,624) between the bridge output terminals 624 and 622, the same voltage as the voltage ΔV(622,623) between the bridge output terminals 623 and 622 is applied as the input voltage ΔV(607) of the comparator 607.

At the time $t_2$, since the analog switch 602 is turned to the ON state and the analog switch 601 is turned to the OFF state, the voltage V(6031) of the non-inverting input terminal 6031 of the opamp 603 is changed from the reference voltage $V_{02}$ to $V_{01}$, as shown in FIG. 11(5). When the reference voltage $V_{01}$ is applied to the terminal 6031, the temperature $T_h$ of the electric heater 51 is linearly decreased at a given slope in accordance with the time elapsed, as shown in FIG. 11(1).

At a time $t_3$, the temperature $T_h$ of the electric heater 51 reaches the second preset temperature $T_2$, as shown in FIG. 11(1).

After the time $t_3$, the same operation as that at the time $t_0$ is repeated, and as shown in FIG. 11(6), the output level of the comparator 607 alternates between HIGH and LOW levels at high speed. Therefore, the temperature $T_h$ of the electric heater 51 is maintained at the second preset temperature $T_2$, as shown in FIG. 11(1).

When the above operations are repeated, the temperature $T_h$ of the electric heater 51 is maintained at the second preset temperature $T_2$ before the start signal is applied to the start signal input terminal 661, as shown in FIG. 11(1). Immediately after the start signal is applied to the terminal 661, the temperature $T_h$ begins to increase. Then, immediately after the temperature $T_h$ reaches the first preset temperature $T_1$, it is decreased again. When the temperature $T_h$ reaches the second preset temperature, it is maintained at the second preset temperature $T_2$ until the next start signal is applied. In response to changes in the temperature $T_h$ of the electric heater 51, a pulse signal shown in FIG. 11(7) having a predetermined LOW level interval is generated from the flow rate signal output terminal 651.

The LOW level interval t(b) of this pulse signal obviously corresponds to an interval during which the temperature $T_h$ of the electric heater 51 shown in FIG. 11(1) is increased, i.e., an interval during which the electric heater 51 is heated.

The relationship between the LOW level interval t(b) of the flow rate output signal and the intake air amount Q(AIR) is clearly equal to the flow rate characteristics of t(b) shown in FIG. 6.

Unlike the device shown in FIG. 1, in the device shown in FIG. 10, the measurement start time $t_1$ can be determined by a start signal generated from the fuel control circuit 3 as in the device shown in FIG. 8. Thus, the engine revolution synchronous sampling operation of the intake air amount Q(AIR) can be performed, and a stable air flow rate signal can be generated.

Figure 12:
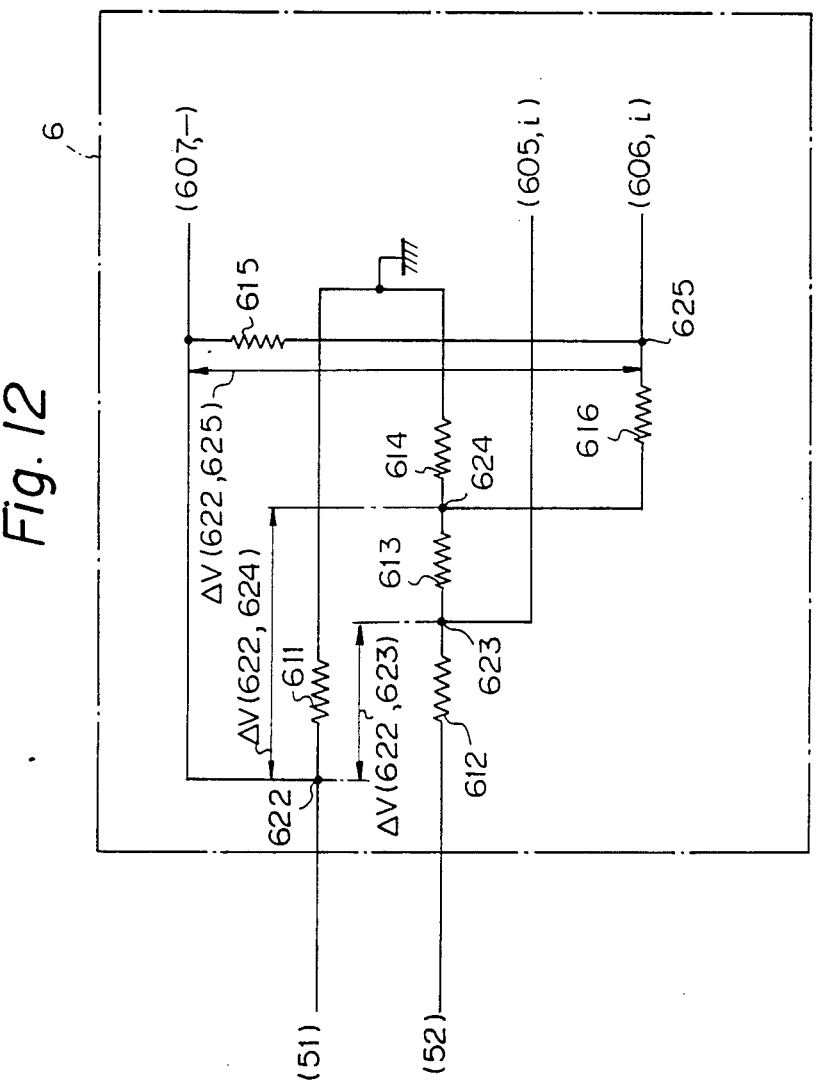
FIG. 12 is a view showing still another embodiment of the present invention.

FIG. 12 shows an air flow rate measuring device according to still another embodiment of the present invention.

Unlike the device shown in FIG. 1, in the device shown in FIG. 12, a bridge output terminal 622 is connected to one terminal of a resistor 615, and the other terminal thereof is connected to one terminal of a resistor 616. The other terminal of the resistor 616 is connected to a bridge output terminal 624. A common node 625 between the resistors 615 and 616 is connected to an input terminal i of an analog switch 606.

Figure 13:
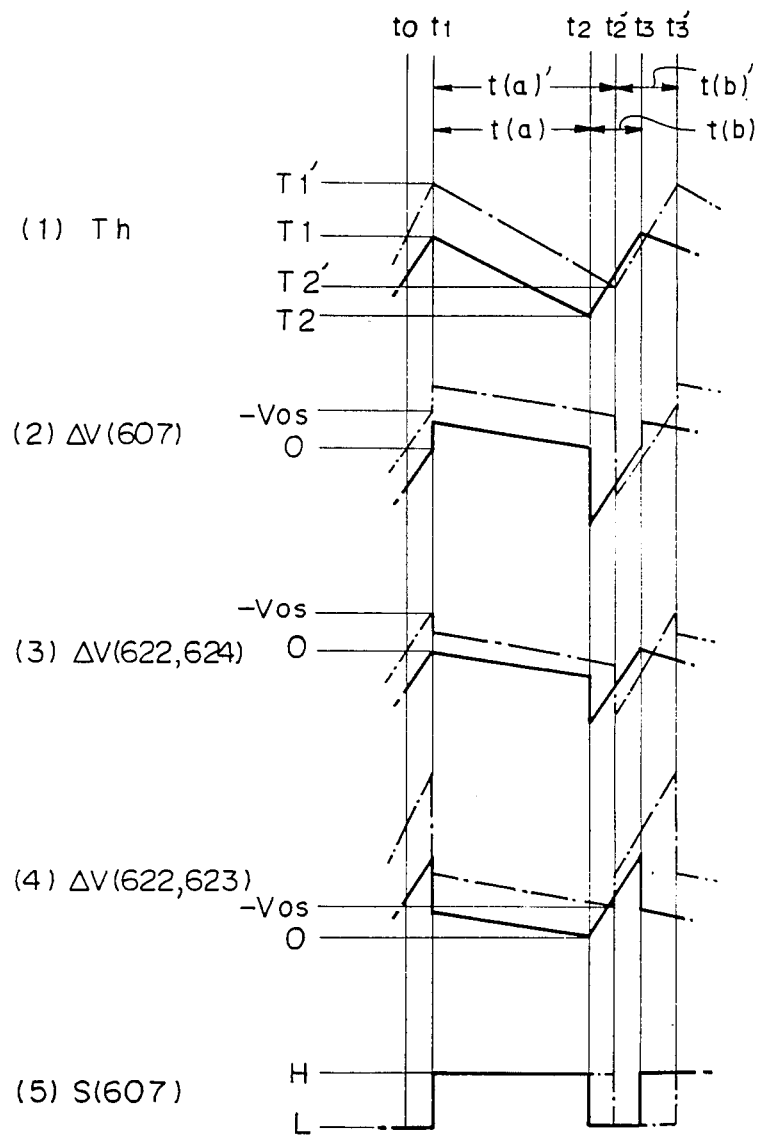
FIG. 13 is a timing chart showing the operation of the present invention when an input offset voltage of a comparator in the device of FIG. 1 is a predetermined voltage.
Figure 14:
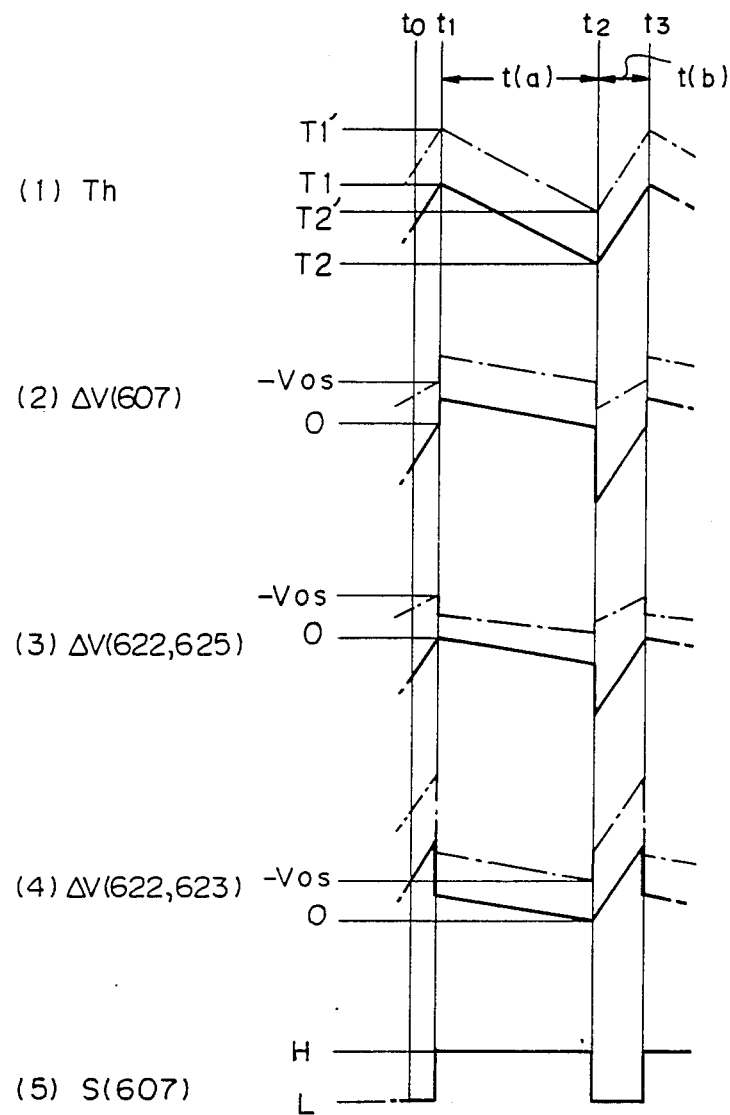
FIG. 14 is a timing chart showing the operation of the device in FIG. 12.

Operation of the device shown in FIG. 12 will be described hereinafter with reference to the timing chart shown in FIGS. 13 and 14. FIG. 13 shows a timing chart showing the operation of the device of FIG. 1, and FIG. 14 shows a timing chart showing the operation of the device in which an electronic circuit shown in FIG. 1 is changed as shown in FIG. 12.

Waveforms indicated by solid lines in FIG. 13 are exactly the same as the waveforms shown in FIG. 5. The waveforms shown in FIG. 5 are ideal waveforms when an input offset voltage of the comparator 607 is at 0 V. However, in practice, the input offset voltage is shifted from 0 V, and the operation waveforms of the actual air flow rate measuring device are different from those shown in FIG. 13.

For example, when the input offset voltage of the comparator 607 is at a negative voltage "$V_{os}$", the operation waveforms of the device of the invention are modified to those indicated by alternate long and short dashed lines in FIG. 13. The waveforms indicated by the alternate long and short dashed lines will be described hereinafter.

As can be seen from the waveforms indicated by the alternate long and short dashed lines in FIG. 13, the following differences are found as compared to those indicated by the solid lines.

First, as shown in FIG. 13(3), at the time $t_1$, the voltage ΔV(622,624) between the bridge output terminals 624 and 622 reaches a voltage $-V_{os}$ (since a voltage $V_{os}$ is negative, the voltage $-V_{os}$ is positive). As shown in FIG. 13(4), at the time $t_2'$, the voltage ΔV(622,623) between the bridge output terminals 623 and 622 also reaches the voltage $-V_{os}$. Therefore, the input voltage ΔV(607) of the comparator 607 is also at the voltage $-V_{os}$ at the time $t_1$, and still at the voltage $-V_{os}$ at the time $t_2'$. This is because an input offset voltage $V_{os}$ is supplied to the comparator 607, and a reference voltage thereof shifts by the voltage $-V_{os}$.

Second, the first preset temperature $T_1$ of the temperature $T_h$ of the electric heater 51 shown in FIG. 13(1) is increased to $T_1'$, and the second preset temperature $T_2$ thereof is increased to $T_2'$. Furthermore, a difference $(T_1-T_2)$ between the two preset temperatures is changed to $(T_1'-T_2')$, and $(T_1'-T_2')$ is larger than $(T_1-T_2)$, that is:

$$(T_1-T_2)<(T_1'-T_2') \tag{19}$$

Third, the HIGH level interval of the flow rate output signal shown in FIG. 13(5) generated from the flow rate signal output terminal 631 is increased from t(a) to t(a)′, and the LOW level interval thereof is also increased from t(b) to t(b)′:

$$t(a)<t(a)' \tag{20}$$

$$t(b)<t(b)' \tag{21}$$

Thus, equations (20) and (21) are established, as is apparent, from the waveform of the temperature $T_h$ of the electric heater 51 shown in FIG. 13(1) and equation (19). For example, when a portion (i.e., the interval t(a)) from the time $t_1$ to $t_2$ illustrated by the solid line waveform and that from the time $t_1$ to $t_2'$ (i.e., the interval t(a)′) illustrated by the alternate long and short dashed line waveform are compared with each other, they have the same slope. However, since the difference between the respective two preset temperatures has the relationship expressed by equation (19), the interval t(a)′ from the time $t_1$ to $t_2'$ becomes longer than the interval t(a) from the time $t_1$ to $t_2$. Equation (21) is also established for the same reason as described above.

Thus, even though the intake air amount Q(AIR) is constant, when the input offset voltage of the comparator 607 is not 0 V, the HIGH and LOW level intervals t(a) and t(b) of the flow rate output signal generated from the terminal 631 are changed, and therefore, the flow rate characteristic shown in FIG. 6 are also varied, causing an error.

The operation will be described hereinafter with reference to the timing chart shown in FIG. 14. Solid line waveforms shown in FIG. 14 are the same as those shown in FIG. 13, and illustrate the case wherein the input offset voltage of the comparator 607 is at 0 V. Waveforms indicated by the alternate long and short dashed lines in FIG. 14 illustrate the case wherein the input offset voltage of the comparator 607 is a negative voltage $V_{os}$. As can be seen from the waveforms indicated by the alternate long and short dashed lines, the following differences can be found as compared to those shown in FIG. 13.

First, a difference $(T_1-T_2)$ between the two preset temperatures of the temperature $T_h$ of the electric heater 51 is equal to a difference $(T_1'-T_2')$ thereof, as shown in FIG. 14(1):

$$(T_1-T_2)=(T_1'-T_2') \tag{22}$$

Second, in the HIGH and LOW level intervals t(a) and t(b) shown in FIG. 14(5) of the flow rate output signal generated from the terminal 631, waveforms illustrated by the solid lines coincide with those illustrated by the alternate long and short dashed lines. When the intake air amount Q(AIR) is constant, even if the input offset voltage of the comparator 607 is not 0 V, the intervals t(a) and t(b) are not changed and the flow rate characteristics shown in FIG. 6 are not varied, resulting in no error:

$$t(a)=t(a)' \tag{23}$$

$$t(b)=t(b)' \tag{24}$$

A condition for establishing equation (22) which is required for establishing equations (23) and (24) will be explained.

A voltage $\Delta V(622,625)$ between the terminals 625 and 622 shown in FIG. 14(3) reaches the voltage $-V_{os}$ at the time $t_1$. At this time, the bridge circuit 61 slightly shifts from the balanced state given by equation (6). Assuming that the resistance of the heater 51 at this time is $R_{h1}'$, the following equations can be established:

$$V(621)=\{(R_{611}+R_{h1}')/R_{611}\}\times V_{02} \tag{25}$$

$$V_{02}-V_{os}'=\{R_{614}/(R_{612}+R_{613}+R_{614}+R_r)\}\times V(-621) \tag{26}$$

where V(621) is a voltage of the bridge input terminal 612, and $V_{os}'$ is the voltage $\Delta V(622,624)$ between the bridge output terminals 624 and 622 at the time $t_1$.

Equations (25) and (26) can be rewritten by eliminating V(621) as follows:

$$R_{h1}' = \{R_{611} \times (R_{612} + R_{613} + R_r)/R_{614}\} - \{V_{os}' \times R_{611} \times (R_{612} + R_{613} + R_{614} + R_r)/(V_{02} \times R_{614})\} \tag{27}$$

Equation (6) is modified so as to obtain the following equation:

$$R_{h1}=\{R_{611}\times R_{613}+R_r)\}/R_{614} \tag{28}$$

When a change in the resistance of the electric heater 51 is given by $R_{h1}$, it is given as:

$$\Delta R_{h1}=R_{h1}'-R_{h1} \tag{29}$$

Equations (27) and (28) are substituted in equation (29), to eliminate $R_{h1}'$ and $R_{h1}$, thus obtaining the following equation:

$$\Delta R_{h1}=-(V_{os}'/V_{02})\times\{R_{611}\times(R_{612}+R_{613}+R_{614}+R_r)\}/R_{614} \tag{30}$$

The voltage $V_{os}'$ can be given by the following equation from the sensor control circuit 6 shown in FIG. 12:

$$V_{os}=\{(R_{615}/(R_{615}+R_{616})\}\times V_{os}' \tag{31}$$

The voltage $\Delta V(622,623)$ between the bridge output terminals 623 and 622 shown in FIG. 14(4) reaches the voltage $-V_{os}$ at the time $t_2$. At this time, the bridge circuit 61 shifts from the balanced state given by equation (6). Assuming that the resistance of the electric heater 51 at this time is $R_{h2}'$, the following equation can be established:

$$V(621)=\{(R_{611}+R_{h2}')/R_{611}\}\times V_{01} \tag{32}$$

$$V_{01}-V_{os}=\{(R_{613}+R_{614})/(R_{612}+R_{613}+R_{614}+R_r)\}\times V(621) \tag{33}$$

Equations (32) and (33) can be rewritten by eliminating V(621), thus obtaining the following equation:

$$R_{h2}' = \{R_{611} \times (R_{612} + R_r)/(R_{613} + R_{614})\} - \{V_{os} \times R_{611} \times (R_{612} + R_{613} + R_{614} + \tag{34}$$

-continued
$$R_r)\}/\{V_{01} \times (R_{613} + R_{614})\}$$

Equation (10) can be modified as follows:

$$R_{h2} = \{R_{611} \times (R_{612} + R_r)\}/(R_{613} + R_{614}) \quad (35)$$

When a change in the resistance of the electric heater 51 at the time $t_2$ is given by $\Delta R_{h2}$:

$$\Delta R_{h2} = R_{h2}' - R_{h2} \quad (36)$$

Equations (34) and (35) are substituted in equation (36), to eliminate $R_{h2}'$ and $R_{h2}$, thus obtaining the following equation:

$$\Delta R_{h2} = -(V_{os}/V_{01}) \times \{R_{611} \times (R_{612} + R_{613} + R_{614} + R_r)\}/(R_{613} + R_{614}) \quad (37)$$

In order to establish equation (22), $\Delta R_{h1}$ and $\Delta R_{h2}$ shown in equations (30) and (37) can be equal to each other:

$$\Delta R_{h1} = \Delta R_{h2} \quad (38)$$

This is because the resistance $R_h$ of the electric heater 51 has the temperature characteristic given by equation (2), and when a change $\Delta R_h$ of the resistance $R_h$ is constant, a change $\Delta T_h$ of the temperature $T_h$ becomes constant and equation (22) can be satisfied.

Equations (30), (31) and (37) are substituted in equation (38) so as to obtain the following equation:

$$R_{615}/(R_{615} + R_{616}) = (V_{01}/V_{02}) \times \{(R_{613} + R_{614})/R_{614}\} \quad (39)$$

In the actual sensor control circuit 6, the resistance $R_{613}$ of the resistor 613 is very much smaller than the resistance $R_{614}$ of the resistor 614:

$$R_{613} < R_{614} \quad (40)$$

Therefore, the following equation can be established:

$$(R_{613} + R_{614})/R_{614} = 1 \quad (41)$$

When equation (41) is substituted in equation (39):

$$R_{615}/(R_{615} + R_{616}) = V_{01}/V_{02} \quad (42)$$

As is apparent from equation (42), the resistors 615 and 616 can be considered as an attenuator which converts the voltage $\Delta V$ (622,624) between the bridge output terminals 624 and 622 into the voltage $\Delta V(622,625)$ between the terminals 625 and 622. When an attenuation factor $\alpha(=R_{615}/(R_{615} + R_{616}))$ of this attenuator is set to be equal to a ratio $V_{01}/V_{02}$ of the reference voltages $V_{01}$ and $V_{02}$, even when the input offset voltage of the comparator 607 is changed, equation (22) can always be established and equations (23) and (24) can always be established. For this reason, the flow rate characteristics shown in FIG. 6 are not changed, and no error occurs.

Therefore, when the attenuator described above is provided between the bridge circuit 61 and the comparator 607 for detecting the bridge output signal, if the input offset voltage $V_{os}$ of the comparator 607 varies, the output signal cannot be influenced thereby. In addition, a high-precision comparator 607 is not required, and a low-cost comparator can be used.

It should be noted that in the device shown in FIG. 1, the lower selected temperature (i.e., the second preset temperature) can be sufficiently high, e.g., 300° C. or more, during operation of the electric heater provided in the air flow path. In this manner, when the selected temperature is set to be sufficiently high contamination of the electric heater can be avoided, thus preventing the burn-off phenomenon. In this manner, the electrical characteristic of the electric heater does not vary, and a high precision in the temperature characteristic can be maintained. Note that an upper limit of the selected temperature is the level at which the electrical characteristics of the electric heater do not vary.

The temperature $T_1$ of the electric heater shown in FIG. 5(1) is set at a level at which the electrical characteristics thereof do not vary due to heat, and the temperature $T_2$ is set at 300° C. or more.

Figure 15:
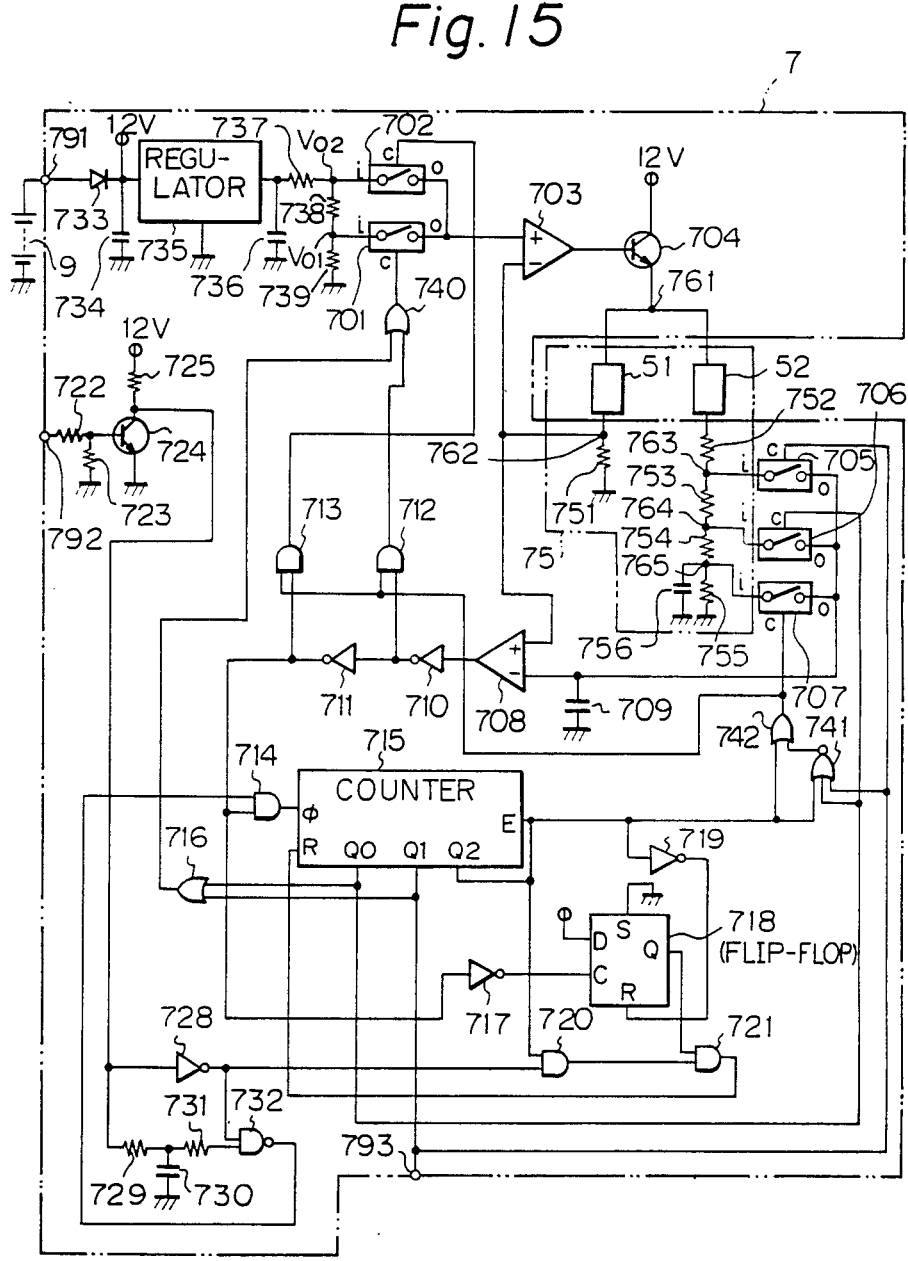
FIG. 15 is a view showing still another embodiment of the present invention.

FIG. 15 shows still another embodiment of the present invention. A constant voltage source 9 such as a battery (e.g., 12 V) is connected to a terminal 791. The terminal 791 is connected to the input terminal of a 3-terminal regulator 735 through a reverse-flow preventive diode 733 and an oscillation preventive capacitor 734. A constant voltage (e.g., 5 V) appears at the output terminal of the regulator 735. A capacitor 736 is provided for controlling a ripple component. The obtained constant voltage is attenuated by resistors 737, 738, and 739, to obtain reference voltages $V_{01}$ and $V_{02}$. The reference voltages $V_{01}$ and $V_{02}$ are supplied to respective input terminals i of analog switches 701 and 702, and respective output terminals o thereof are commonly connected to the "+" input terminal of an opamp 703. When a "1" signal is supplied to control terminals C of the analog switches 701 and 702, either the reference voltage $V_{01}$ or $V_{02}$ is supplied to the "+" input terminal of the opamp 703. The transistor 704 amplifies the output voltage of the opamp 703 and supplies it to the bridge input terminal 761.

The bridge circuit 75 comprises an electric heater 51, a temperature compensation resistor 52, resistors 751, 752, 753, 754, and 755 and an oscillation preventive capacitor 756, and has the bridge input terminal 761 and bridge output terminals 762, 763, 764, and 765. The bridge output terminals 763, 764, and 765 are respectively connected to input terminals i of analog switches 705, 706, and 707. Output terminals o of the analog switches 705, 706, and 707 are commonly connected to the "−" input terminal of a comparator 708 through a noise-limiter capacitor 709. On the other hand, the output terminal 762 of the bridge circuit 75 is connected to the "−" input terminal of opamp 703 and the "+" input terminal of the comparator 708. Note that the opamp 703 is operated in such a manner that a breakdown voltage of the resistor 751 coincides with either the reference voltage $V_{02}$ or $V_{01}$. The comparator 708 is operated in such a manner that it compares selectively the reference voltages $V_{01}$ or $V_{02}$ with the voltage of the bridge output terminals 763 to 765, to generate a pulse signal from the output terminal thereof. A NOT gate 710 inverts the output signal from the comparator 708, and the output therefrom is supplied to one input terminal of AND gate 712 and the input terminal of a NOT gate 711. The output from the NOT gate 711 is supplied to one input terminal of an AND gate 713 and to one input terminal of a NOT gate 717 at the same time.

An input terminal 792 of a circuit 7 serves as a flow rate signal input terminal, and is connected to the base of a signal-shaping transistor 724 through resistors 722 and 723. The collector of the transistor 724 is pulled up by a resistor 725, and the emitter thereof is grounded. The collector of the transistor 724 is connected to an integrating circuit consisting of a NOT gate 728, resistors 729 and 731, and a capacitor 730. Input terminals of a NAND gate 732 are connected to an output terminal of the NOT gate 728 and the output of the integrating circuit. The output terminal of the NAND gate 732 is connected to the other input terminal of the AND gate 714. The output terminal of the NOT gate 728 is connected to the NAND gate 732 and is also connected to one input terminal of an AND gate 720.

Reference numeral 715 denotes a decimal counter, and plays and important role in the sequence of the circuit shown in FIG. 15. A clock input terminal $\phi$ of the counter 715 is connected to the output terminal of the AND gate 714, and a $Q_0$ output terminal thereof if connected to one input terminal of an OR gate 716, the control terminal C of the analog switch 706, and a first input terminal of a 3-input NOR gate 741. A $Q_1$ output terminal of the counter 715 is connected to the other input terminal of the OR gate 716, the control terminal C of the analog switch 705, a second input terminal of the 3-input NOR gate 741, and a flow rate signal output terminal 793 of the sensor control circuit 7. A $Q_2$ output terminal of the counter 715 is connected to an enable terminal E thereof, the other input terminal of the AND gate 720, one input terminal of an OR gate 742, and a third input terminal of the 3-input NOR gate 741. An output from the 3-input NOR gate 741 is connected to the other input terminal of the OR gate 742. An output from the OR gate 742 is connected to the control terminal C of the analog switch 707 and the other input terminals of the AND gates 712 and 713. The analog switch 707 is turned ON when a "1" signal is supplied from the $Q_2$ output terminal of the counter 715 or from the output terminal of the 3-input NOR gate 741. The 3-input NOR gate 741 is used for preventing all the analog switches 705, 706 and 707 from being turned OFF when a "0 " signal is supplied from all the $Q_0$, $Q_1$, and $Q_2$ output terminals of the counter 715 in an initial state. In such a state, the "1" signal is supplied from the output terminal of the counter 715 to turn on the analog switch 707.

Reference numeral 718 denotes a D flip-flop whose clock input terminal C is connected to the output terminal of the NOT gate 717. A reset terminal R of the flip-flop 718 is connected to the output terminal of a NOT gate 719, a data input terminal D thereof is pulled up, and a set terminal S thereof is pulled down. A Q output terminal of the flip-flop 718 is connected to one input terminal of an AND gate 721. The other input terminal of the AND gate 721 is connected to the output terminal of the AND gate 720. The output terminal of the AND gate 721 is connected to a reset terminal R of the counter 715. The output terminal of the AND gate 713 is connected to the control terminal C of the analog switch 702. The output terminal of the AND gate 712 is connected to one input terminal of an OR gate 740. The other input terminal of the OR gate 740 is connected to the output terminal of the OR gate 716, and the output terminal of the OR gate 740 is connected to the control terminal C of the analog switch 701.

With this arrangement, the operation thereof will be described hereinafter.

A predetermined amount of air determined by an opening of the throttle valve 16 passes through the intake pipe 13 via the air cleaner 12 and is taken into the engine E. A given amount of air of the total intake air passes through the flow rate measuring pipe 53 and is taken into the engine E.

The temperature compensation resistor 52 is located at a position at which it cannot be influenced by heat generated from the electric heater 51, and is influenced only by air temperature. The temperature of the electric heater 51 is increased by electrical conduction, but is decreased by the intake air.

Operation of the overall electronic circuit of the air flow measuring device according to the embodiment of the present invention shown in FIG. 15 will be described hereinafter with reference to the timing chart shown in FIG. 16.

Figure 16:
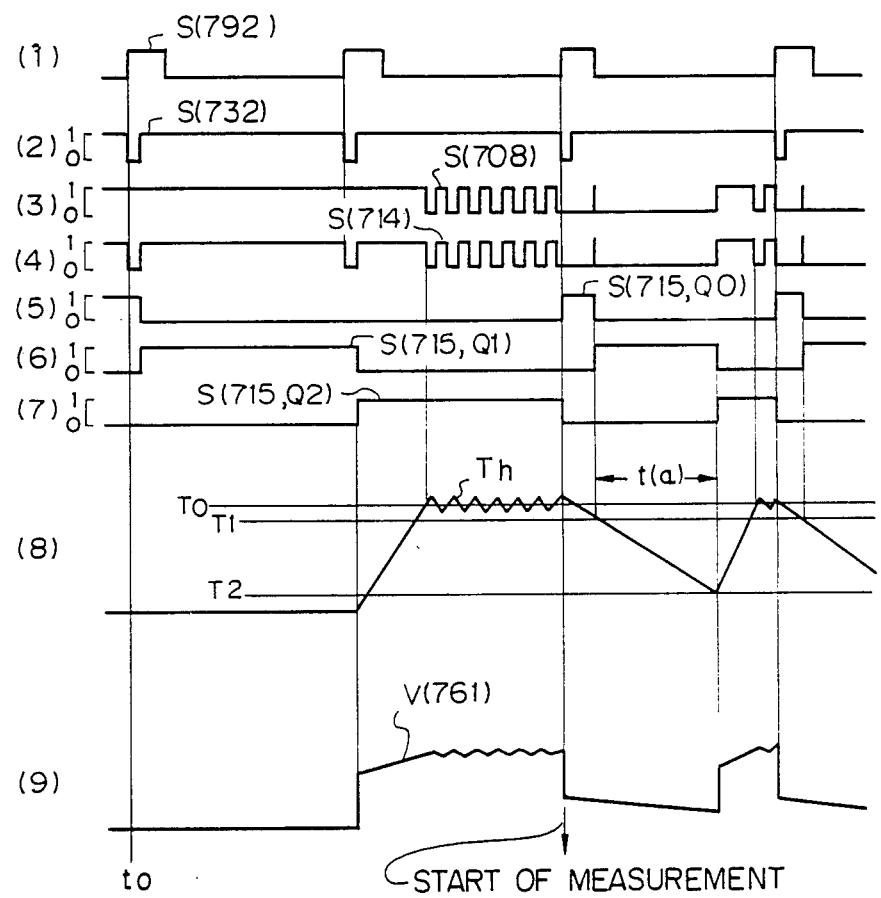
FIG. 16 is a timing chart showing the operation of the device in FIG. 15.

In the timing chart of FIG. 16, FIG. 16(1) shows a signal S(792) for initiating the measurement of the air flow rate; FIG. 16(2), an output signal S(732) of the NAND gate 732; FIG. 16(3), an output signal S(708) of the comparator 708; FIG. 16(4), a clock input signal S(714) of the counter 715; FIG. 16(5), a $Q_0$ output signal S(715,$Q_0$) of the counter 715; FIG. 16(6), a $Q_1$ output signal S(715,$Q_1$) of the counter 715 as an output signal of the circuit 7; and FIG. 16(7), a $Q_2$ output signal S(715,$Q_2$) of the counter 715. FIG. 16(8) shows a waveform of the temperature $T_h$ of the electric heater 51, and FIG. 16(9) shows a waveform of a voltage V(761) of the input terminal 761 of the bridge circuit 75.

An operating state at a time $t_0$ will first be described. At this time, when the output from the comparator 708 is a "1" signal, as shown in FIG. 16(3), the output from the NOT gate 710 is a "0" signal, and the output from the NOT gate 711 is a "1" signal. On the other hand, when the signal S(792) is supplied from the terminal 792, the signal derived from the collector of the transistor 724 is an inverted signal S(792), and the inverted signal is supplied to the NAND gate 732 through the NOT gate 728 or the integrating circuit consisting of the resistors 729 and 731 and the capacitor 730. When the inverted signal passes through the NAND gate 732, a signal which becomes a "0" signal having a fall time of about 1μs in synchronism with the leading edge of the signal S(792) can be obtained. This signal is supplied to one input terminal of the AND gate 714, and the other input terminal thereof receives a "1" signal from the comparator 708, as shown in FIG. 16(3). For this reason, the signal S(732) shown in FIG. 16(2) is supplied to the terminal $\phi$ of the counter 715. In this case, if the count state of the counter 715 is $Q_0$ or $Q_1$, the signal S(732) of FIG. 16(2) is counted twice or once, thereby shifting the state of the counter 715 to $Q_2$. However, since the $Q_2$ output is connected to the clock enable terminal E, the following count operation is inhibited, and the $Q_2$ output is maintained at the "1" level. In response to this, the output of the OR gate 742 becomes a "1" signal, and the analog switch 707 is turned into the ON state. Since the outputs from the AND gates 712 and 713 respectively become the "0" and "1" signals, the analog switch 702 is turned to the ON state, and the reference voltage $V_{02}$ is supplied to the "+" input terminal of the opamp 703.

When the circuit 7 is supplied with power, the comparator 708 is set to generate the "1" signal. Since the $Q_0$ or $Q_1$ output of the counter 15 generates the "1" signal, the analog switches 701 and 705 or 706 are kept on. Thus, the bridge circuit 75 is not balanced, and the electric heater 51 is kept cooled. For this reason, the voltage of the terminal 762 is higher than that of the terminal 764, and therefore, the comparator 708 generates the "1" signal. Meanwhile, when the circuit 7 is powered, if the $Q_2$ output generates the "1" signal, either of the AND gates 712 or 713 generates the "1" signal regardless of the signal level of the comparator 708. Thus, the analog switches 701 or 702 and 707 are turned ON. Therefore, the comparator 708 generates the "1" signal in the same manner as described above. Furthermore, when any of the $Q_0$, $Q_1$ and $Q_2$ outputs generates the "0" signal, the analog switch 707 is turned ON by the NOR gate 741. In addition, since the analog switch 701 or 702 is turned ON as described above, the comparator 708 generates the "1" signal in the same manner as described above. In this manner, when the circuit 7 is supplied with power, the comparator 708 always generates the "1" signal.

An electronic circuit consisting of the opamp 703, the transistor 704, the electric heater 51, and the resistor 751 comprises a constant current circuit. The constant current circuit is operated so that voltage across the two ends of the resistor 751 is equal to the voltage at the "+" input terminal of the opamp 703. In this case, a current flowing in the resistor 751, i.e., a current $I_h$ flowing in the electric heater 51, is expressed by the following equation:

$$I_h = (V_{02})/(R_{751}) \tag{43}$$

where $R_{751}$ is the resistance of the resistor 751.

The current $I_h$ flowing in the electric heater 51 is set to be high enough to increase the temperature $T_h$ of the electric heater 51 and to overcome the cooling effect of the intake air. Therefore, the temperature $T_h$ of the electric heater 51 is linearly increased at a given slope in accordance with the time elapsed, as shown in FIG. 16(8).

A resistance $R_h$ of the electric heater 51 has a constant temperature coefficient $K_h$ and varies depending upon the temperature $T_h$ in accordance with the relationship represented by the following equation:

$$R_h = R_{h0} \times (1 + K_h \times T_h) \tag{44}$$

where $R_{h0}$ is the resistance of the electric heater at a temperature of 0° C., and $K_h > 0$.

Therefore, since the voltage V(761) of the bridge input terminal 761 is obtained by adding the voltages across the two ends of the resistor 751 and those of the electric heater 51, it can be expressed as follows by using equations (43) and (44):

$$V(761) = V_{02} + V_{02} \times R_{h0} \times (1 + K_h \times T_h)/R_{751} \tag{45}$$

In equation (45), since the temperature coefficient $K_h$ is larger than 0, the voltage V(761) of the bridge input terminal 761 is increased in accordance with an increase in the temperature $T_h$ of the electric heater 51, as shown in FIG. 16(8).

The current flowing in the temperature compensation resistor 52 is set to be sufficiently low by setting the resistances of the resistors 752 to 755, so that the temperature $T_{52}$ of the temperature compensation resistor 52 does not become higher than the air temperature due to heat generated by the resistor 52. Therefore, the temperature $T_{52}$ of the temperature compensation resistor 52 can be considered the air temperature. A resistance $R_{52}$ of the temperature compensation resistor 52 has a constant temperature coefficient $K_{52}$. The resistance $R_{52}$ of the temperature compensation resistor 52, whose temperature $T_{52}$ can be considered as an intake air temperature $T_{air}$, is given by the following equation:

$$R_{52} = R_{520} \times (1 + K_{52} \times T_{52}) \tag{46}$$

where $R_{520}$ is the resistance of the temperature compensation resistor 52 at a temperature of 0° C., and $K_{52} > 0$.

Since the voltage V(761) of the terminal 761 is increased in accordance with an increase in the temperature of the electric heater 51, the potentials of the terminals 763, 764, and 765 are also increased. When the resistances of the resistors 752, 753, 754, and 755 are respectively given by $R_{752}$, $R_{753}$, $R_{754}$, and $R_{755}$, these potentials $V_{763}$, $V_{764}$, and $V_{765}$ can be expressed by the following equations, respectively:

$$V_{763} = V_{761} \times (R_{753} + R_{754} + R_{755})/(R_{752} + R_{753} + R_{754} + R_{755} + R_{52}) \tag{47}$$

$$V_{764} = V_{761} \times (R_{754} + R_{755})/(R_{752} + R_{753} + R_{754} + R_{755} + R_{52}) \tag{48}$$

$$V_{765} = V_{761} \times R_{755}/(R_{752} + R_{753} + R_{754} + R_{755} + R_{52}) \tag{49}$$

Since the voltage $V_{762}$ of the terminal 762 is constant, the relationship among a preset temperature $T_2$ of the electric heater temperature $T_h$ for satisfying $V_{763} = V_{762}$, a preset temperature $T_1$ of the electric heater temperature $T_h$ for satisfying $V_{764} = V_{762}$, and a preset temperature $T_0$ of the electric heater temperature $T_h$ for satisfying $V_{765} = V_{762}$, is $T_2 < T_1 < T_0$. As is apparent from equations (46), (47), (48), and (49), the preset temperatures $T_0$, $T_1$, and $T_2$ increase with an increase in the intake air temperature $T_{air}$, and shift substantially in parallel to each other.

Now, since the analog switch 707 is in the ON state, the comparator 708 compares the voltages $V_{762}$ and $V_{765}$. When the temperature $T_h$ of the electric heater 51 is increased and reaches the preset temperature $T_0$, the voltage $V_{765}$ supplied from the terminal 765 to the "+" input terminal of the comparator 708 is higher than the voltage $V_{762}$ supplied to the "−" input terminal thereof from the terminal 762. Thus, the "0" signal is generated from the comparator 708. In response to this, since the NOT gate 710 generates the "1" signal and the NOT gate 711 generates the "0" signal, the analog switch 701 is turned ON and the analog switch 702 is turned OFF. In this manner, the reference voltage $V_{01}$ is applied to the "+" input terminal of the opamp 703. In this case, since the opamp 703 is operated so that $V_{762} = V_{01}$ is established, the current $I_h$ flowing in the electric heater 51 is as follows:

$$I_h = V_{01}/R_{751}$$

The reference voltage $V_{01}$ is set so that the electric heater 51 can be sufficiently cooled by a small amount of intake air, and the electric heater temperature $T_h$ is quickly decreased below the preset temperature $T_0$. The comparator 708 generates the "1" signal again, and the electric heater 51 is heated. When the above operations are repeated, the comparator 708 alternately generates the "1" and "0" signals at high speed, and the temperature $T_h$ of the electric heater 51 is maintained substantially at the preset temperature $T_0$.

When the temperature $T_h$ of the electric heater 51 reaches the preset temperature $T_0$, i.e., when the comparator 708 generates the "0" signal, the output from the NOT gate 717 rises. At this time, the counter 715 generates the "1" signal from the $Q_2$ output thereof and the flip-flop 718 generates the "0" signal from the reset terminal R thereof. In addition, since a potential of the data input terminal D of the flip-flop 718 is previously increased, i.e., the "1" signal is generated therefrom, the flip-flop 718 generates the "1" signal from the Q output.

At this time, when the signal S(792) is supplied, an inverted signal of the signal S(792) is generated from the collector side of the transistor 724 and is further inverted by the NOT gate 728, thus obtaining the same signal as the signal S(792). The obtained signal passes through the AND gates 720 and 721 and thus the "1" signal is supplied to the reset terminal R of the counter 715. Note that this time corresponds to the start of the measurement.

When the counter 715 is reset, the $Q_0$ output, i.e., the signal $S(715, Q_0)$ shown in FIG. 16(5), becomes the "1" signal, and the $Q_2$ output, i.e., the signal $S(715, Q_2)$ shown in FIG. 16(7), becomes the "0" signal. Thus, the analog switches 706 and 701 are turned ON. Therefore, the reference voltage $V_{01}$ is supplied to the "+" input terminal of the opamp 703, and the electric heater 51 is cooled by the intake air. When the temperature $T_h$ of the electric heater 51 reaches the preset temperature $T_1$, the comparator 708 generates the "1" signal. A clock signal is then supplied to the terminal $\phi$ of the counter 715, and the count state of the counter 715 is turned to $Q_1$. When the $Q_1$ output becomes the "1" signal, since the analog switches 705 and 701 are turned ON, the temperature $T_h$ of the electric heater 51 is compared with the preset temperature $T_2$. At this time, since $T_h > T_2$, the comparator 708 immediately generates the "0" signal. As a result, the output signal of the comparator 708 becomes a pulse signal S(708) having a narrow pulse width, as shown in FIG. 16(3). When the temperature $T_h$ of the electric heater 51 is further decreased and reaches the preset temperature $T_2$, the comparator 708 generates the "1" signal, as shown in FIG. 16(3), and the signal generated from the terminal $\phi$ of the counter 715 rises, as shown in FIG. 16(3). Thus, the $Q_1$ output of the counter 715 falls, as shown in FIG. 16(6), and the $Q_2$ output rises, as shown in FIG. 16(7). When the $Q_2$ output rises, since the clock enable terminal E also rises, the count state of the counter 715 is maintained at the $Q_2$ state until reset by the signal S(792). Therefore, the electric heater 51 is heated to the preset temperature $T_0$ and is controlled in preparation for the next measurement in such a manner that the temperature $T_h$ thereof is maintained at the preset temperature $T_0$.

As can be seen from FIGS. 16(6) and 16(8), the time required for decreasing the temperature $T_h$ of the electric heater from the preset temperature $T_1$ to $T_2$ corresponds to a pulse width t(a) shown in FIG. 16(6), and the signal having the pulse width t(a) is generated from the flow rate signal output terminal 793 connected to the $Q_1$ output terminal of the counter 715. The pulse width t(a) is determined by a rate at which the amount of heat accumulated in the electric heater 51 is decreased by the cooling effect of the intake air, and the cooling effect increases/decreases with an increase/decrease in the intake air amount Q(AIR).

Therefore, when the intake air amount Q(AIR) is large, since the temperature $T_h$ of the electric heater 51 is decreased rapidly, the pulse width t(a) becomes short. Conversely, when the intake air amount Q(AIR) is large, the pulse width t(a) becomes long. The electric heater 51 is kept cooled during an interval of the pulse width t(a). Even when the intake air flow is irregular, the flow rate of air which passes near the electric heater 51 and changes over a period of time promotes a decrease in the temperature $T_h$ thereof, and the flow rate which changes over a period of time is integrated as a decrease in the temperature $T_h$ of the electric heater 51 during the interval of the pulse width t(a). Therefore, the value of the pulse width t(a) corresponds to an approximate average value of the intake air amount Q(AIR) during the interval of the pulse width t(a). From this integration, since a ripple component due to the irregular air flow can be removed, when the air flow amount Q(AIR) is obtained from the pulse width t(a) in accordance with flow rate characteristics thereof, a stable flow rate of air from which the ripple component can be removed is calculated.

Since the pulse width t(a) becomes small in accordance with an increase in the flow rate, the relationship between the flow rate and the output pulse width is approximate to a hyperbolic function. Therefore, even when the flow rate of air is low, the detection property cannot be degraded, thus obtaining a highly precise flow rate signal even in an engine idling state.

When the intake air temperature $T_{air}$ is changed, temperature compensation must be performed so as not to change the flow rate characteristics upon temperature change. The temperature compensation resistor 52 is provided for performing temperature compensation, and comprises the bridge circuit 75 together with the electric heater 51. The temperature compensation mechanism will be described hereinafter.

A principle of the temperature compensation mechanism is that constants of elements constituting the bridge circuit 75 must be set to satisfy the following two conditions:

A condition where a difference $(T_2 - T_{air})$ between preset temperature $T_2$ and the intake air temperature $T_{air}$ is not changed even when the temperature $T_{air}$ is changed, i.e., $$T_2 - T_{air} = \text{const} \tag{50}$$

A condition where a difference $(T_1 - T_2)$ between the two preset temperatures $T_1$ and $T_2$ is not changed, i.e., $$T_1 - T_2 = \text{const} \tag{51}$$

$(T_2 - T_{air})$ is set to be constant because a coefficient of thermal conductivity between the electric heater 51 and the intake air is to be constant. On the other hand, $(T_1 - T_2)$ is set to be constant because a total heat amount conducted from the electric heater 51 to the intake air is to be constant during the interval t(a). When the coefficient of thermal conductivity and the total heat amount are set to be constant, the terminal t(a) is not changed even if the intake air temperature $T_{air}$ is changed, thus compensating for the temperature characteristic.

Constants of the elements comprising the bridge circuit 75 which satisfy equations (50) and (51) will be described hereinafter.

First, a condition for equation (50) will be explained. When the resistance of the electric heater 51 is given by $R_{h2}$, a condition which is established when the temperature $T_h$ of the electric heater 51 reaches the preset temperature $T_2$ is given by the following equations (52) and (53) from a balanced condition of the bridge circuit 75:

$$R_{h2} = R_{h0} \times (1 + K_h \times T_2) \tag{52}$$

$$(R_{h2} + R_{752}) \times R_{751} = R_{h2} \times (R_{753} + R_{754}) \quad (53)$$

$R_{52}$ of the temperature compensation resistor 52 can be given by equation (46):

$$R_{52} = R_{520} \times (1 + K_{52} \times T_{air}) \quad (46)$$

Equations (46) and (51) are substituted in equation (53), to eliminate $R_{52}$ and $R_{h2}$, thus obtaining the following equation:

$$T_2 = [\{R_{520} \times (1 + K_{52} \times T_{air}) + R_{752}\} \times \quad (54)$$
$$R_{751} - R_{h0} \times (R_{753} + R_{754} + R_{755})]/$$
$$\{R_{h0} \times K_h \times (R_{753} + R_{754} + R_{755})\}$$

Equation (54) is substituted in equation (50), to eliminate $T_2$, and considering the numerator thereof, the following equation can be obtained:

$$\{R_{520} \times K_{52} \times R_{751} - R_{h0} \times K_h \times (R_{753} + R_{754} + \quad (55)$$
$$R_{755}) \times T_{air} + (R_{520} + R_{752}) \times R_{751} - (R_{753} +$$
$$R_{754} + R_{755}) \times R_{h0} = \text{const}$$

In equation (55), since the right side is constant, the left side must be constant. However, since the intake air temperature $T_{air}$ is a variable, the coefficient of $T_{air}$ must be 0. That is:

$$R_{520} \times K_{52} \times R_{751} - R_{h0} \times K_h \times (R_{753} + R_{754} + R_{755}) = 0 \quad (56)$$

Equation (56) can be rewritten as follows:

$$(R_{520} \times K_{52})/(R_{h0} \times K_h) = (R_{753} + R_{754} + R_{755})/R_{751} \quad (57)$$

From equation (57), a ratio of a value ($R_{h0}33\ K_h$) obtained by multiplying the resistance $R_{h0}$ of the electric heater 51 at 0° C. with the temperature coefficient $K_r$ to a value ($R_{520} \times K_{52}$) obtained by multiplying the resistance $R_{520}$ of the temperature compensation resistor 52 at 0° C. with the temperature coefficient $K_{52}$ can be set to be equal to a ratio of the resistance $R_{751}$ of the resistor 751 to a value ($R_{753} + R_{754} + R_{755}$) obtained by adding the resistance of the resistors 753, 754, and 755. Thus, equation (50) can be satisfied in spite of the intake air temperature $T_{air}$.

A condition of equation (51) will be explained.

A condition which is established when the temperature $T_h$ of the electric heater 51 reaches the preset temperature $T_1$ is expressed by equations (58) and (59):

$$R_{h1} = R_{h0} \times (1 + K_h \times T_1) \quad (58)$$

$$(R_{52} + R_{752} + R_{753}) \times R_{751} = R_{h1} \times (R_{754} + R_{755}) \quad (59)$$

where $R_{h1}$ is the resistance when the temperature $T_h$ reaches the preset temperature $T_1$.

Equations (46) and (58) are substituted in equation (59) to eliminate $R_{52}$ and $R_{h1}$, thus obtaining the following equation:

$$T_1 = [\{R_{520} \times (1 + K_{52} \times T_{air}) + R_{752} + \quad (60)$$

-continued
$$R_{753}\} \times R_{751} - R_{h0} \times (R_{754} + R_{755})]/$$
$$\{R_{h0} \times K_h \times (R_{754} + R_{755})\}$$

Equations (54) and (60) are substituted in equation (51), to eliminate $T_1$ and $T_2$, thus obtaining the following equation:

$$R_{751} \times R_{753} \times \{(R_{752} + R_{753} + R_{754} + R_{755}R_{520}) + R_{520} \times K_{52} \times T_{52}\} = \text{const} \quad (61)$$

From equation (61), even when the intake air temperature $T_{air}$ is changed, if a term ($R_{520} \times K_{52} \times T_{air}$) is set to be very much smaller than a term ($R_{752} + R_{753} + R_{754} + R_{755} + R_{520}$), the left side of equation (18) can be considered as constant. Therefore, equation (51) can be satisfied.

As is apparent from the above explanation of the temperature compensation conditions, when the constants of the elements comprising the bridge circuit 75 are set in accordance with equations (57) and (61), even when the intake air temperature $T_{air}$ is changed, the flow rate characteristics are not changed, and the temperature characteristic can be compensated for.

Figure 17:
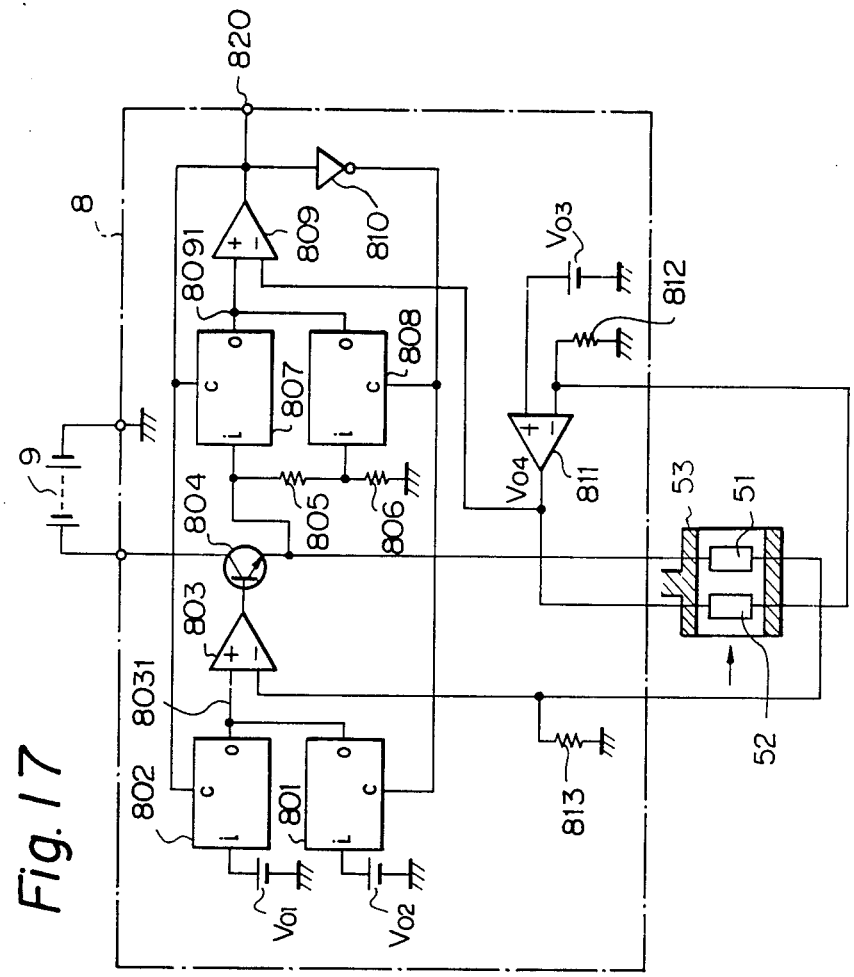
FIG. 17 is a view showing still another embodiment of the present invention.

FIG. 17 shows still another embodiment of the present invention. A reference voltage $V_{02}$ is applied to an input terminal i of an analog switch 801. A reference voltage $V_{01}$ is applied to an input terminal i of an analog switch 802. Output terminals o of the analog switches 801 and 802 are commonly connected to a non-inverting input terminal of an opamp 803. The output terminal of the opamp 803 is connected to the base of a power transistor 804, the emitter of which is grounded through the electric heater 51 and the resistor 813. The inverting input terminal of the opamp 803 is connected to a common node between the electric heater 51 and the resistor 813. The emitter of the power transistor 804 is grounded through resistors 805 and 806, and a common node therebetween is connected to an input terminal i of the analog switch 808. The emitter of the power transistor 804 is also connected to an input terminal i of the analog switch 807. Output terminals o of the analog switches 807 and 808 are commonly connected to the non-inverting input terminal of a comparator 809. Control terminals C of the analog switches 802 and 807, the input terminal of the inverter 810 and the flow rate signal output terminal 820 are commonly connected to the output terminal of the comparator 809. Control terminals C of the analog switches 801 and 808 are commonly connected to the output terminal of the inverter 810. Therefore, when a voltage appearing at the flow rate signal output terminal 820 is at HIGH level, the analog switches 802 and 807 are turned ON and the analog switches 801 and 808 are turned OFF. Conversely, when the voltage is at LOW level, the analog switches 802 and 807 are turned OFF, and the analog switches 801 and 808 are turned ON.

The output terminal of an opamp 811 is grounded through the temperature dependent resistor 52 and resistor 812, and the inverting input terminal thereof is connected to a common node between the resistors 52 and 812. Reference voltage $V_{03}$ is applied to the non-inverting input terminal of the opamp 811. The output terminal of the opamp 811 is also connected to the inverting input terminal of the comparator 809.

The collector of the power transistor 804 is connected to the positive terminal of the battery 9, to supply current, and the negative terminal of the battery 9 is grounded. Although not shown, the analog switches 801, 802, 807, and 808, the opamp 803 and 811, the comparator 809, and the inverter 810 are powered by the battery 9.

Operation of the device shown in FIG. 17 will be described hereinafter.

A predetermined amount of air determined by an opening of the throttle valve 16 is taken into the engine E through the intake pipe 13 via the air cleaner 12. A constant amount of air in the total intake air passes through the flow rate measuring pipe 53 and is taken into the engine E.

The temperature compensation resistor 52 is located at a position at which it is not influenced by heat of the electric heater 51 and is influenced only by the air temperature. The temperature of the electric heater 51 is increased when power is supplied, but is decreased by cooling from the intake air.

Operation of the air flow rate measuring device shown in FIG. 17 will be described with reference to the timing chart shown in FIG. 18.

The operating state at a time $t_0$ will first be described. At this time, assuming that the flow rate signal output terminal 820 is at LOW level, as shown in FIG. 18(5), the LOW level signal is inverted by the inverter 810, and HIGH level signal is applied to the control terminal C of the analog switch 801. Thus, the analog switch 801 is in the ON state, and the reference voltage $V_{02}$ is applied to the non-inverting input terminal of opamp 803 through the analog switch 801, as shown in FIG. 18(4). At the time $t_0$, as described above, the analog switch 802 is in the OFF state. A circuit consisting of the opamp 803, the power transistor 804, the electric heater 51, and the resistor 813 comprises a constant current circuit. The constant current circuit is operated so that the voltage across the two ends of the resistor 813 is equal to the voltage $V(8031)$ of the non-inverting input terminal of the opamp 803, i.e., the terminal 8031. At this time, current flowing in the resistor 813, i.e., current $I_h$ flowing in the electric heater 51, is expressed as follows:

$$I_h = V_{02}/R_{813} \quad (62)$$

where $R_{813}$ is the resistance of the resistor 813.

Note that the current $I_h$ flowed in the electric heater 51 must be set to be high enough to increase the temperature $T_h$ of the electric heater 51 so as to overcome the cooling effect of the intake air. Therefore, the temperature $T_h$ of the electric heater 51 is linearly increased at a given slope in accordance with the time elapsed, as shown in FIG. 18(1). The slope is determined by the relationship between the heat generated by the electric heater 51 and the heater amount conducted by air.

A resistance $R_h$ of the electric heater 51 has a constant temperature coefficient $K_h$ and varies in accordance with the temperature $T_h$ based upon the relationship expressed by the following equation:

$$R_h = R_{h0} \times (1 + K_h \times T_h) \quad (63)$$

where $R_{h0}$ is the resistance of the electric heater 51 at a temperature of 0° C., and $K_h > 0$. Therefore, since a voltage V(804,E) of a terminal corresponding to the emitter of the power transistor 804 is obtained by adding the voltages across the two ends of the resistor 813 and those of the electric heater 51, the voltage V(804,E) can be expressed as follows using equations (62) and (63):

$$V(804,E) = V_{02} + V_{02} \times R_{h0} \times (1 + K_h \times T_h)/R_{813} \quad (64)$$

Figure 18:
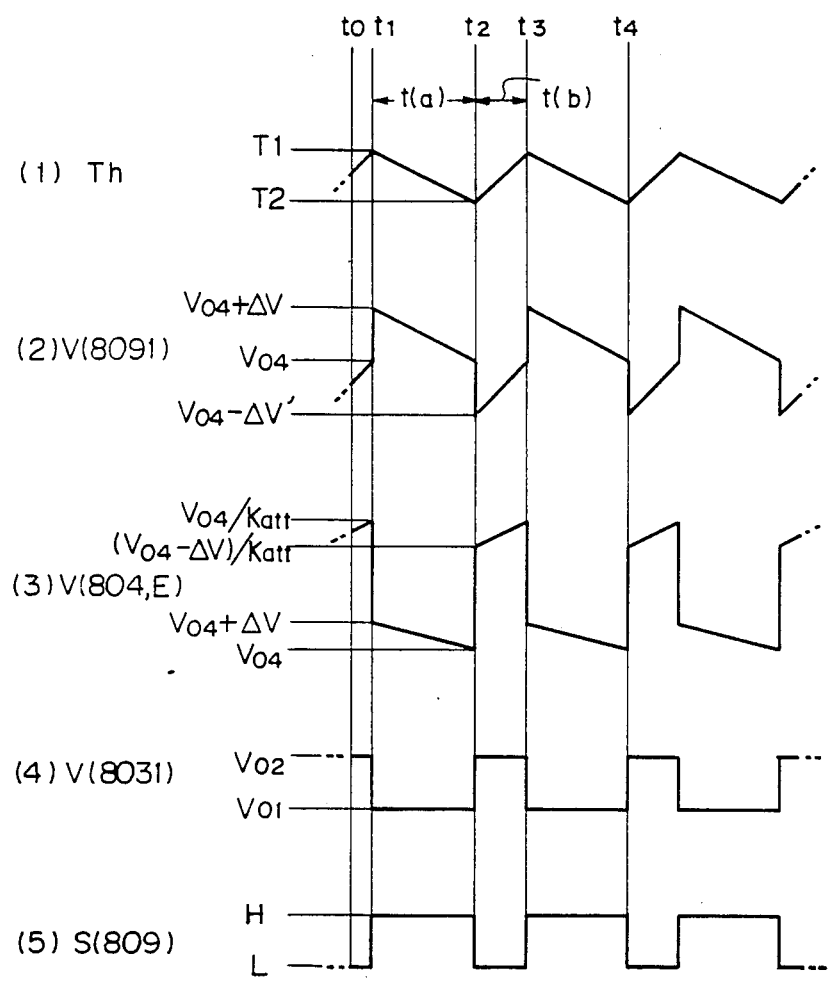
FIG. 18 is a timing chart showing the operation of the device in FIG. 17.

Since the temperature coefficient $K_h > 0$ in equation (64), the voltage V(804,E) is increased in accordance with an increase in the temperature $T_h$ of the electric heater 51, as shown in FIG. 18(3).

A circuit consisting of the temperature compensation resistor 52, the resistor 812, the opamp 811, and the reference voltage $V_{03}$ also comprises a constant current circuit. The constant current circuit is operated so that the voltage across the two ends of the resistor 812 is equal to the reference voltage $V_{03}$. At this time, a current flowing in the resistor 812, i.e., a current $I_{52}$ flowing in the temperature dependent resistor 52, can be expressed by the following equation:

$$I_{52} = V_{03}/R_{812} \quad (65)$$

where $R_{812}$ is the resistance of the resistor 812.

The current $I_{52}$ flowing in the temperature compensation resistor 52 must be set sufficiently low that the temperature $T_{52}$ of the temperature compensation resistor 52 does not exceed the air temperature due to heat generated by the resistor 52. Therefore, the temperature $T_{52}$ the temperature compensation resistor 52 can be considered as the air temperature. A resistance $R_{52}$ of the temperature compensation resistor 52 has a constant temperature coefficient $K_{52}$ and varies in accordance with the temperature $T_{52}$ of the resistor 52, i.e., the air temperature $T_{air}$, based upon the relationship expressed by the following equation:

$$R_{52} = R_{520} \times (1 + K_{52} \times T_{air}) \quad (66)$$

where $R_{520}$ is the resistance of the temperature compensation resistor 52 at a temperature of 0° C., and $K_{52} > 0$. Therefore, since the output terminal voltage $V_{04}$ of the opamp 811 is obtained by adding voltages across the two ends of the resistor 812 and those of the temperature dependent resistor 52, the output terminal voltage $V_{04}$ of the opamp 811 can be expressed as follows using equations (65) and (66):

$$V_{04} = V_{03} + V_{03} \times R_{520} \times (1 + K_{52} \times T_{air})/R_{812} \quad (67)$$

In equation (67), since the temperature coefficient $K_{52} > 0$, when the air temperature $T_{air}$ is increased, the output terminal voltage $V_{04}$ of the opamp 811 is also increased.

At the time $t_0$, since the HIGH level signal from the output terminal of the inverter 810 is also applied to the control terminal C of the analog switch 808, the analog switch 808 is in the ON state, and the analog switch 807 is in the OFF state. A voltage appearing at the common node between the resistors 805 and 806 is applied to a terminal 8091 corresponding to the noninverting input terminal of the comparator 809 via the analog switch 808. The voltage $V_{(8091)}$ applied to the terminal 8091 can be expressed as follows by defining an attenuation coefficient $K_{att}$:

$$\left. \begin{array}{l} V_{(8091)} = V(804,E) \times K_{att} \\ K_{att} = R_{806}/(R_{805} + R_{806}) \end{array} \right\} \quad (68)$$

where $R_{805}$ and $R_{806}$ are respectively resistances of the resistors 805 and 806, and $0 < K_{att} < 1$.

At a time $t_1$, the temperature $T_h$ of the electric heater 51 is increased to a first preset temperature $T_1$, as shown in FIG. 18(1). With this increase in the temperature of the electric heater 51, from equation (64), the voltage V(804,E) of the emitter of the power transistor 804 is increased to a voltage ($V_{04}/K_{att}$) obtained by dividing the output terminal voltage $V_{04}$ by the attenuation coefficient $K_{att}$, as shown in FIG. 18(3). The voltage V(804,E) of the emitter of the power transistor 804 coincides with the voltage ($V_{04}/K_{att}$), as apparent from equation (67), because the voltage $V_{(8091)}$ of the terminal 8091 coincides with the output terminal voltage $V_{04}$ of the opamp 811 at the time $t_1$, as shown in FIG. 18(2).

At the time $t_1$, as shown in FIG. 18(2), the voltage $V_{(8091)}$ of the terminal 8091 exceeds the output terminal voltage $V_{04}$ of the opamp 811, and is supplied to the non-inverting input terminal of the comparator 809. On the other hand, the output terminal voltage $V_{04}$ of the opamp 811 is applied to the inverting input terminal of the comparator 809. For this reason, the output level of the comparator 809 is changed from LOW level to HIGH level, as shown in FIG. 18(5). In response to this, the analog switch 801 receives the LOW level signal through the inverter 810 at the control terminal C thereof and is turned to the OFF state. Then, since the HIGH level signal is applied to the control terminal C of the analog switch 802, it is turned to the ON state. Accordingly as shown in FIG. 18(4), the reference voltage $V_{01}$ is applied to the non-inverting input terminal (terminal 8031) of the opamp 803 instead of the reference voltage $V_{02}$. At this time, the voltage V(804,E) of the emitter of the power transistor 804 can be expressed as follows by changing $V_{02}$ to $V_{01}$ in equation (64):

$$V(804,E) = V_{01} + V_{01} \times R_{h0} \times (1 + K_h \times T_h)/R_{813} \qquad (69)$$

At the time $t_1$, in response to the change in the logic level from LOW level to HIGH level shown in FIG. 18(5), the analog switch 808 is turned to the OFF state, and the analog switch 807 is turned to the ON state. Accordingly, the voltage V(804,E) is directly applied to the non-inverting input terminal 8091 of the comparator 809 in place of the voltage (V(804,E)$\times K_{att}$) obtained by multiplying the voltage V(804,E) of the emitter of the power transistor 804 with the attenuation coefficient $K_{att}$ (i.e., V(804,E) = $V_{(8091)}$). It should be noted that the reference voltage $V_{01}$ is set so that the voltage V(804,E) of the emitter of the power transistor 804 given by equation (69) is equal to a voltage ($V_{04} + \Delta V$) (where $\Delta V > 0$; $\Delta V$ will be described later) obtained by adding the output terminal voltage $V_{04}$ of the opamp 811 to a first predetermined voltage $\Delta V$. Therefore, as shown in FIG. 18(2), at the time $t_1$, the voltage $V_{(8091)}$ of the terminal 8091 is increased stepwise from the output terminal voltage $V_{04}$ of the opamp 811 to the voltage ($V_{04} + \Delta V$) which is higher that the voltage $V_{04}$ by the first predetermined voltage $\Delta V$. As shown in FIG. 18(3), the voltage V(804,E) of the emitter of the power transistor 804 is decreased stepwise from the voltage ($V_{04}/K_{att}$) to the voltage ($V_{04} + \Delta V$).

The reference voltage $V_{01}$ is set so that the current $I_h$ of the electric heater 51 is sufficiently low. A heat amount decrease by a cooling effect of the intake air exceeds the heat of the electric heater 51 generated due to the current $I_h$. Therefore, the temperature $T_h$ of the electric heater 51 is linearly decreased at a given slope after the time $t_1$ in accordance with the time elapsed, as shown in FIG. 18(1). The given slope is determined by the relationship between the heat amount and the heat capacity of the electric heater 51 and heat conducted by air. When the intake air amount is larger, the amount of heat conducted thereby is increased. For this reason, the temperature $T_h$ of the electric heater 51 is decreased rapidly, and the slope is increased.

After the time $t_1$, as shown in FIG. 18(1), since the temperature $T_h$ of the electric heater 51 is decreased from the first preset temperature $T_1$ in accordance with the time elapsed, from the relationship given by equation (69), the voltage V(804,E) of the emitter of the power transistor 804 is also decreased from the voltage ($V_{04} + \Delta V$), as shown in FIG. 18(3). The voltage $V_{(8091)}$ of the terminal 8091 is also decreased from the voltage ($V_{04} + \Delta V$). Because the analog switch 807 is kept in the ON state and the voltage V(804,E) is applied to the terminal 8091, the voltage $V_{(8091)}$ and V(804,E) coincide and are similarly decreased from the voltage ($V_{04} + \Delta V$), as shown in FIGS. 18(2) and 18(3).

At a time $t_2$, the temperature $T_h$ of the electric heater 51 is decreased to a second preset temperature $T_2$, as shown in FIG. 18(1), and from the relationship given by equation (69), the voltage V(804,E) of the emitter of the power transistor 804 is also decreased to the output terminal voltage $V_{04}$ of the opamp 811, as shown in FIG. 18(3). As shown in FIG. 18(2), the voltage $V_{(8091)}$ of the terminal 8091 is also decreased to the output terminal voltage $V_{04}$ of the opamp 811 in the same manner as in the voltage V(804,E) of the emitter of the transistor 804.

At the time $t_2$, as shown in FIG. 18(2), the voltage $V_{(8091)}$ of the terminal 8091 exceeds the output terminal voltage $V_{04}$ of the opamp 811. Since the voltage $V_{8091}$ is supplied to the non-inverting input terminal of the comparator 809 and the output terminal voltage $V_{04}$ of the opamp 811 is applied to the inverting input terminal thereof, the output level of the comparator 809 is changed from HIGH level to LOW level, as shown in FIG. 18(5). In response to this, the analog switch 802 is turned to the OFF state, and the analog switch 801 is turned to the ON state. Thus, as shown in FIG. 18(4), the reference voltage $V_{02}$ is applied to the non-inverting input terminal 8031 of the opamp 803 instead of the reference voltage $V_{01}$. The voltage V(804,E) of the emitter of the power transistor 804 at this time is given by equation (64), and the relationship between the reference voltages $V_{01}$ and $V_{02}$ is $V_{01} < V_{02}$. Therefore, the voltage V(804,E) of the emitter of the power transistor 804 is increased stepwise At the time $t_2$, since the analog switch 807 is turned to the OFF state and the analog switch 808 is turned to the ON state in response to a change in the logic level from HIGH level to LOW level shown in FIG. 18(5), the voltage $V_{(8091)}$ of the terminal 8091 becomes equal to not the voltage V(804,E) but the voltage (V(804,E)$\times K_{att}$) which is a product of the voltage V(804,E) of the emitter of the power transistor 804 and the attenuation coefficient $K_{att}$. The voltage (V(804,E)$\times K_{att}$) is applied to the non-inverting input terminal of the comparator 809. Note that the voltage V(804,E) of the emitter of the power transistor 804 given by equation (64) is increased stepwise to a voltge (($V_{04} - \Delta V'$)/$K_{att}$) which is obtained by dividing a difference between the output terminal voltage $V_{04}$ of the opamp 811 and a second predetermined voltage $\Delta V'$ by the attenuation coefficient $K_{att}$.

The first and second predetermined voltages $\Delta V$ and $\Delta V'$ will be examplified hereinafter. The first predetermined voltage $\Delta V$ is determined in the following manner. From FIGS. 18(1) and 18(3), immediately after the time $t_1$, since the temperature $T_h$ of the electric heater 51 is the first preset temperature $T_1$, and the voltage V(804,E) of the emitter of the power transistor 804 is the voltage $(V_{04}+\Delta V)$, the following equation can be established using equation (69):

$$V_{04}+\Delta V = V_{01} + V_{01} \times R_{h0} \times (1 + K_h \times T_1)/R_{813} \tag{70}$$

At the time $t_2$, since the temperature $T_h$ of the electric heater 51 is the second preset temperature $T_2$, and the voltage V(804,E) of the emitter of the power transistor 804 is the output terminal voltage $V_{04}$ of the opamp 811, the following equation can be obtained using equation (69):

$$V_{04} = \Delta V_{01} + V_{01} \times R_{h0} \times (1 + K_h \times T_1)/R_{813} \tag{71}$$

The first predetermined voltage V can be obtained to eliminate $V_{04}$ from equations (70) and (71):

$$\Delta V = V_{01} \times R_{h0} \times K_h \times (T_1 - T_2)/R_{813} \tag{72}$$

For the second predetermined voltage $\Delta V'$, immediately after the time $t_2$, since the temperature $T_h$ of the electric heater 51 is the second preset temperature $T_2$ and the voltage V(804,E) of the emitter of the power transistor 804 is the voltage $(V_{04}-\Delta V')/K_{att}$ described above, the following relationship can be obtained using equation (64):

$$(V_{04}-\Delta V')/K_{att} = V_{02} + V_{02} \times R_{h0} \times (1+K_h \times T_2)/R_{813} \tag{73}$$

At the time $t_1$, since the temperature $T_h$ of the electric heater 51 is the first preset temperature $T_1$, and the voltage V(804,E) is the voltage $(V_{04}/V_{att})$, the following relationship can be obtained using equation (64):

$$V_{04}/K_{att} = V_{02} \times V_{02} \times R_{h0} \times (1+K_h \times T_1)/R_{813} \tag{74}$$

The second predetermined voltage $\Delta V'$ can be obtained to eliminate $V_{04}$ from equations (73) and (74):

$$V = K_{att} \times V_{02} \times R_{h0} \times K_h \times (T_1-T_2)/R_{813} \tag{75}$$

Immediately after the time $t_2$, as shown in FIG. 18(3), the voltage V(804,E) of the emitter of the power transistor 804 is changed to the voltage $((V_{04}-\Delta V')/K_{att})$ described above from the output terminal voltage $V_{04}$ of the opamp 811, and the analog switch 808 is in the ON state. For this reason, from equation (68), the voltage $V_{(8091)}$ of the terminal 8091 is decreased stepwise from the output terminal voltage $V_{04}$ of the opamp 811 to a voltage $(V_{04}-\Delta V')$ which is a difference between the output terminal voltage $V_{04}$ of the opamp 811 and the second predetermined voltage $\Delta V'$.

After the time $t_2$, the current $I_h$ given by equation (62) flows in the electric heater 51 to increase a heat amount thereof, and as shown in FIG. 18(1), the temperature $T_h$ of the electric heater 51 is linearly increased at a given slope in accordance with the time elapsed. At a time $t_3$, the temperature $T_h$ of the electric heater 51 reaches the first preset temperature $T_1$ after the same process at the time $t_1$.

When the above operations are repeated, the temperature $T_h$ of the electric heater 51 forms a triangular waveform between the temperatures $T_1$ and $T_2$, as shown in FIG. 18(1). Conversely, as shown in FIG. 18(5), the flow rate output signal having a pulse train in which HIGH and LOW levels alternately appear is generated from the flow rate signal output terminal 820. Needless to say, a HIGH level interval t(a) of this pulse train corresponds to an interval during which the temperature $T_h$ of the electric heater 51 shown in FIG. 18(1) is decreased, that is, an interval during which the electric heater 51 is cooled by the intake air. On the other hand, a LOW level interval t(b) corresponds to an interval during which the electric heater 51 is heated.

The relationship between the HIGH level interval t(a) of the flow rate output signal and the intake air amount Q(AIR) will be described hereinafter.

As shown in FIG. 18(1), during the HIGH level interval t(a), the temperature $T_h$ of the electric heater 51 is decreased in accordance with the time elapsed. The time required for decrease is determined by the ratio of the heat accumulated in the electric heater 51 to that lost by the cooling effect of the intake air. The cooling effect increases/decreases with an increase/decrease in the intake air amount Q(AIR). Therefore, when the intake air amount Q(AIR) is large, since the temperature $T_h$ of the electric heater 51 is decreased rapidly, the HIGH level interval t(a) becomes short. In contrast, when the intake air amount Q(AIR) is small, the HIGH level interval t(a) becomes long (FIG. 6). The electric heater 51 is kept cooled by the intake air during the HIGH level interval t(a), and even when the intake air flow becomes irregular, the flow rate which passes near the electric heater 51 and changes over a period of time promotes a decrease in the temperature $T_h$ of the electric heater 51. Thus, the flow rate which changes over a period of time is integrated as a decrease of the temperature $T_h$ of the electric heater 51. Therefore, a value of the HIGH level interval t(a) corresponds to an approximate average value of the intake air amount Q(AIR). With this integration, a ripple component due to the irregular air flow can be removed. For this reason, when the intake air flow amount Q(AIR) is obtained from the HIGH level interval t(a) based upon the flow rate characteristics shown in FIG. 6, a stable air flow rate signal with no ripple component can be obtained.

A case will be described wherein the intake air temperature $T_{air}$ is changed. Since the resistance $R_{52}$ of the temperature compensation resistor 52 is changed in accordance with the intake air temperature $T_{air}$, as in equation (66), the output terminal voltage $V_{04}$ of the opamp 811 which is applied to the inverting input terminal of the comparator 809 is also changed, as in equation (67). If the temperature $T_{52}$ of the temperature compensation resistor 52 is increased, the output terminal voltage $V_{04}$ of the opamp 811 is also increased accordingly.

The air flow rate measuring device of the invention is arranged so that the temperature $T_h$ of the electric heater 51 shown in FIG. 18(1) varies between the preset temperatures $T_1$ and $T_2$. As is apparent from equations (71) and (74), the preset temperatures $T_1$ and $T_2$ can vary in accordance with the output terminal voltage $V_{04}$ of the opamp 811. When the resistance $R_{52}$ and the temperature coefficient $K_{52}$ of the temperature dependent resistor 52, the resistance $R_{812}$ of the resistor 812, and the reference voltage $V_{02}$ are properly set, a difference $(T_2-T_{air})$ between the second preset temperature $T_2$ of the electric heater 51 and the intake air temperature $T_{air}$ can be constant in spite of the intake air temperature $T_{air}$. As a result, a proportion of the heat conducted from the electric heater 51 by the intake air, which mainly determines the flow rate characteristics, is not changed because the difference between the second preset temperature $T_2$ of the electric heater 51 and the intake air temperature $T_{air}$ is constant even if the temperature $T_{air}$ is changed. In other words, the waveform of the temperature $T_h$ of the electric heater 51 illustrated in FIG. 18(1) is not changed as long as the intake air amount Q(AIR) is not changed, even if the intake air temperature $T_{air}$ is changed. For this reason, the preset temperatures $T_1$ and $T_2$ are changed while keeping the difference $(T_1-T_2)$ therebetween constant. Therefore, even when the intake air temperature $T_{air}$ is changed, if the intake air amount Q(AIR) is not changed, the HIGH level interval t(a) of the flow rate output signal shown in FIG. 18(5) is not changed. As can be seen from the above description, the flow rate characteristics are not influenced by the intake air temperature $T_{air}$.

We claim:

1. A device for measuring the flow rate of air comprising:
    an electric heater arranged in a path of air flow and having a temperature dependent resistance material;
    a temperature compensation resistor disposed at a distance from said heater in said path of air flow, the resistance of said resistor being changed according to the temperature of air, said temperature compensation resistor, and said heater being arranged to form a bridge circuit together with a plurality of fixed resistors;
    electric power supply means for supplying said bridge circuit with electric power;
    temperature selection means for selecting one of a plurality of temperature values to be attained by said electric heater, said temperature values being determined according to a change of resistance of said temperature compensation resistor;
    comparator means for comparing the temperature of said electric heater with said selected one of temperature values selected by said temperature selection means;
    electric power value switching means for switching an electric power level of said electric power supply means in response to an output of said comparator means indicative of a condition that one of said selected temperature values is attained or maintained;
    temperature switching means for switching the selected temperature of said temperature selection means substantially simultaneously with the switching of said electric power value switching means; and
    time measurement means for measuring the time required for the change of temperature between said plurality of temperature values due to the change of the temperature of said electric heater caused by the switching by said electric power value switching means;
    the time measured by said time measurement means corresponding to the flow rate of air.

2. A device according to claim 1, wherein the lowest value of said plurality of temperature values is higher than 300° C.

3. A device according to claim 1, wherein said plurality of temperature values are two temperature values.

4. A device according to claim 3, wherein said electric power value switching means carries out the switching immediately upon attainment of one of the two, high and low temperature values.

5. A device according to claim 3, wherein said electric power value switching means carries out the switching in a manner such that the temperature of said electric heater is maintained at a selected temperature after the temperature of said electric heater reaches one of the selected temperature, the level of the electric power being switched by the signals transmitted at a predetermined interval, and the level of the electric power is switched immediately the temperature of said electric heater reaches the other of the selected temperatures.

6. A device according to claim 3, wherein an output signal representing the measured air flow rate is a digital signal having binary, HIGH and LOW, values.

7. A device according to claim 3, wherein the difference between said selected temperature values and the difference between said selected temperature values and the air temperature are maintained at a predetermined value when the temperature of the air changes.

8. A device according to claim 3, wherein said device comprises an attenuator having a predetermined attenuation rate selected to compensate an input offset voltage of said comparator.

9. A device according to claim 1, wherein said plurality of temperature values are three temperature values.

10. A device according to claim 8, wherein said device comprises:
    temperature attainment detection means for detecting the attainment of the temperature of said electric heater to a selected temperature selected by said temperature selection means, and
    temperature maintenance means for maintaining the temperature of said electric heater at the higher value of selection of said temperature value,
    said electric power value switching means carrying out the switching of the electric power value supplied to said bridge circuit by said selective electric power supply means to the small current value,
    said time measurement means carrying out the measurement of the time required for the change of temperature from the medium temperature value to the low temperature value.

11. A device for measuring the flow rate of air, comprising:
    an electric heater disposed in a path of said air flow, said electric heater comprising a resistant material having a temperature dependent resistance;
    an operational amplifier and a transistor adapted to be coupled to a power source, for forming a constant current circuit together with said electric heater;
    a first switching device coupled to said operational amplifier for switching between a first reference high voltage and a second reference low voltage, said first and second reference voltages being alternatively supplied to said operational amplifier;
    a comparator for comparing a heater voltage produced in accordance with the resistance of said electric heater with a third reference voltage;

an input voltage switching device coupled between said electric heater and said comparator, for supplying said heater voltage to said comparator when said first reference voltage is supplied to said operational amplifier;

a second switching device for switching said first switching device and said input voltage switching device in accordance with an output of said comparator; and an air temperature circuit for varying said third reference voltage in accordance with the temperature of said air flow;

the output of said comparator corresponding to an indication of the flow rate of said air.

* * * * *